US012589897B2

(12) United States Patent
Niemiec

(10) Patent No.: US 12,589,897 B2
(45) Date of Patent: Mar. 31, 2026

(54) APPARATUS AND METHOD FOR CAPTURING ENERGY FROM A VORTICULAR VENTILATOR SYSTEM TO UTILIZE THE ENERGY TO CHARGE A POWER SOURCE

(71) Applicant: Darrin Niemiec, Schaumburg, IL (US)

(72) Inventor: Darrin Niemiec, Schaumburg, IL (US)

(73) Assignee: Go Fan Yourself, LLC, Long Grove, IL (US)

( * ) Notice: Subject to any disclaimer, the term of this patent is extended or adjusted under 35 U.S.C. 154(b) by 0 days.

(21) Appl. No.: 19/169,365

(22) Filed: Apr. 3, 2025

(65) Prior Publication Data

US 2025/0229920 A1 Jul. 17, 2025

Related U.S. Application Data

(63) Continuation-in-part of application No. 18/797,910, filed on Aug. 8, 2024.

(Continued)

(51) Int. Cl.
*B64U 50/34* (2023.01)
*B64U 10/13* (2023.01)
(Continued)

(52) U.S. Cl.
CPC ............. *B64U 50/34* (2023.01); *B64U 20/83* (2023.01); *B64U 20/96* (2023.01); *B64U 50/19* (2023.01); *B64U 50/20* (2023.01); *B64U 10/13* (2023.01)

(58) Field of Classification Search
CPC ...... B64U 20/96; B64U 20/94; B64C 39/006; B64C 39/064; B64D 13/006; B64D 2013/0614
See application file for complete search history.

(56) References Cited

U.S. PATENT DOCUMENTS 8,905,704 B2 * 12/2014 Sauer ...................... F03D 3/062
416/243
10,428,831 B2 10/2019 Niemiec
(Continued)

FOREIGN PATENT DOCUMENTS

CN 111674543 A 9/2020
EP 4403469 A1 7/2024
(Continued)

OTHER PUBLICATIONS https://companiesmarketcap.com/aerospace/largest-companies-by-market-cap/#google_vignette Accessed: Jan. 6, 2025.
(Continued)

*Primary Examiner* — Arfan Y. Sinaki
(74) *Attorney, Agent, or Firm* — Vitale, Vickrey, Niro, Solon & Gasey LLP

(57) ABSTRACT

The present invention relates to an apparatus and method for capturing energy from an unmanned aircraft propeller system and utilizing the energy to charge a battery. The invention further provides for a belt drive system connected to one or more propellers of an unmanned aircraft system commonly referred to as a drone aircraft. The belt drive system may be linked to an alternator or dynamo such that a portion of the energy generated by the rotation force provided to the drive system of the propeller is captured by the alternator or dynamo. The present invention provides for a system where the rotational energy of the propellers is captured by an energy recovery system such as an alternator, dynamo or the like. The energy recovery system provides power to charge a battery which can be used to power the drive systems for the propellers, or other electronic systems.

15 Claims, 17 Drawing Sheets

Related U.S. Application Data

(60) Provisional application No. 63/533,222, filed on Aug. 17, 2023.

(51) Int. Cl.

| | | |
|---|---|---|
| *B64U 20/83* | | (2023.01) |
| *B64U 20/96* | | (2023.01) |
| *B64U 50/19* | | (2023.01) |
| *B64U 50/20* | | (2023.01) |

(56) References Cited

U.S. PATENT DOCUMENTS

| | | | | |
|---|---|---|---|---|
| 11,085,415 | B1 * | 8/2021 | Menges | F03D 3/068 |
| 11,168,703 | B2 * | 11/2021 | Niemiec | F04D 19/002 |
| 11,686,321 | B2 * | 6/2023 | Harris | F04D 19/007 |
| | | | | 416/210 R |
| 11,698,081 | B2 * | 7/2023 | Niemiec | F04D 25/088 |
| | | | | 417/423.1 |
| 2004/0072531 | A1 * | 4/2004 | Hurlstone | F04D 29/626 |
| | | | | 454/162 |
| 2016/0298605 | A1 * | 10/2016 | Brendle | F03D 7/06 |
| 2016/0325834 | A1 | 11/2016 | Foster | |
| 2018/0030887 | A1 * | 2/2018 | Zhao | F16H 7/02 |
| 2019/0040845 | A1 * | 2/2019 | Potter | F03D 13/35 |
| 2021/0016880 | A1 * | 1/2021 | Ishikawa | F02B 63/04 |
| 2021/0276723 | A1 * | 9/2021 | Han | B64U 50/13 |
| 2022/0033097 | A1 | 2/2022 | Voltaero | |

FOREIGN PATENT DOCUMENTS

| | | | | | |
|---|---|---|---|---|---|
| GB | 2081882 | A | * | 2/1982 | B63J 2/02 |
| GB | 2620192 | A | * | 1/2024 | F04D 25/045 |

OTHER PUBLICATIONS http://www.geversaircraft.com/ac/propdrive.htm#:~:text=Belt%20drives%20are%20becoming%20common,gearbox%20system%20does%20not%20have Accessed: Jan. 6, 2025.

https://www.goodmorningamerica.com/news/video/drone-powered-vehicles-game-changertransportation-107477435 Accessed: Jan. 6, 2025.

https://www.ien.com/video/video/22889410/airbus-debuts-nextgen-air-taxi-ahead-offirst-flight Accessed: Jan. 6, 2025.

https://www.marketsandmarkets.com/PressReleases/evtol-aircraft.asp#:~:text=The%20report%20%22%20eVTOL%20Aircraft%20Market%20by%20Lift,a%20CAGR%20of%2052.0%25%20during%20the%20forecast%20period. Accessed: Jan. 6, 2025.

https://www.quadgeek.com/how-do-drones-impact-the-environment/ Accessed: Jan. 6, 2025.

https://heighttechnologies.com/products/martlet-mi-1/ Accessed: Jan. 7, 2025.

https://www.deltaquad.com/ Accessed: Jan. 7, 2025.

https://www.liftaircraft.com/ Accessed: Jan. 7, 2025.

European Search Report issued Jan. 8, 2025 in corresponding application No. 24201453.8.

Youtube video: "How to fit a Flettner 2000 Wind Powered Rotary Ventilator" Oct. 23, 2014 https://www.youtube.com/watch?v=09Gpu96ffKo.

Youtube video: "Flettner Ventilator" Jun. 17, 2017 https://www.youtube.com/watch?v=jRtXa7DIVSc.

* cited by examiner

FIG. 16A
FIG. 16B
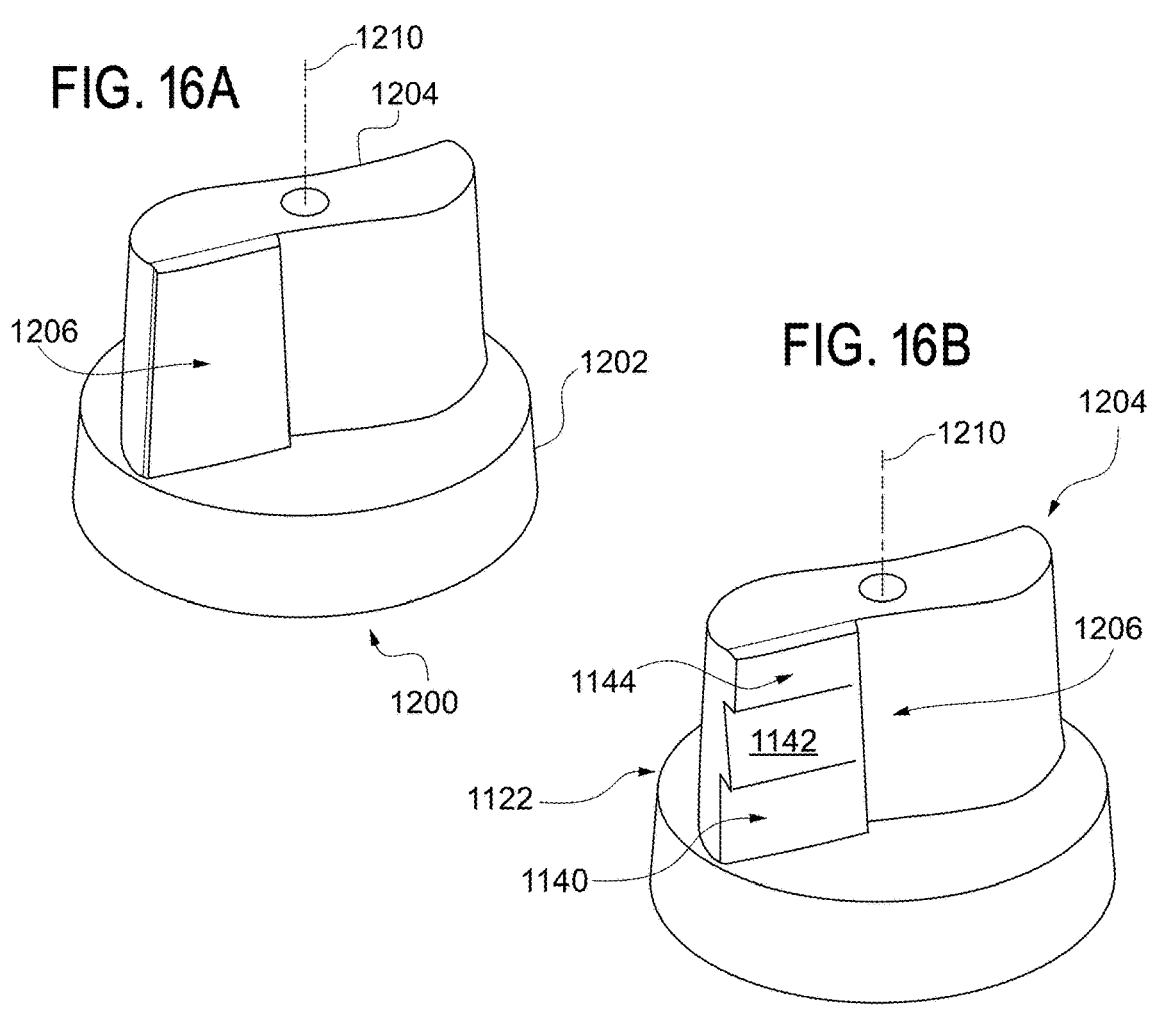
FIG. 17
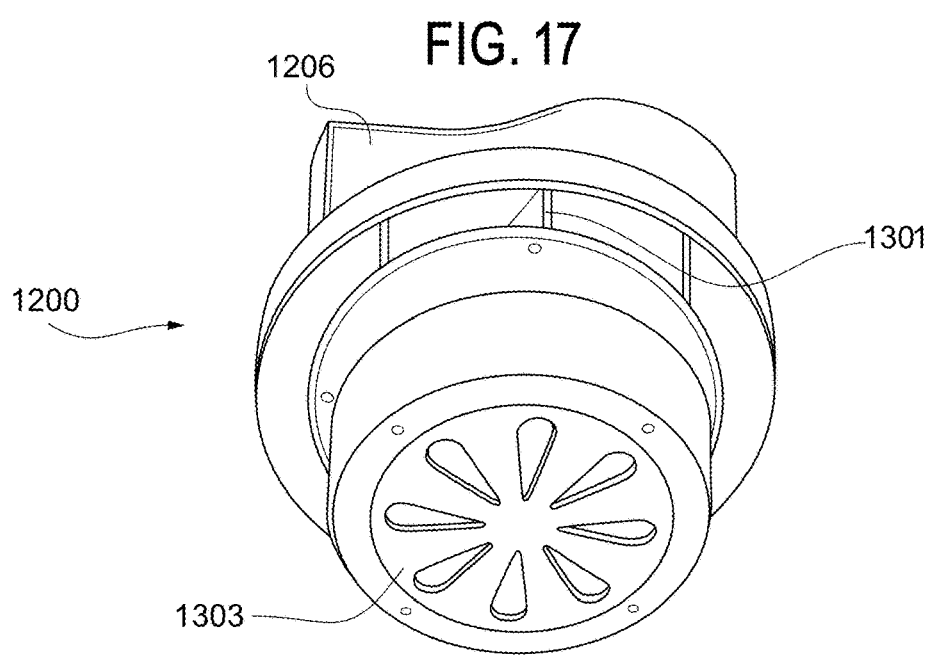

APPARATUS AND METHOD FOR CAPTURING ENERGY FROM A VORTICULAR VENTILATOR SYSTEM TO UTILIZE THE ENERGY TO CHARGE A POWER SOURCE

PRIORITY INFORMATION

This application is a continuation in part of patent application Ser. No. 18/797,910 which was filed on Aug. 8, 2024. The present application further claims priority to Provisional Application No. 63/533,222 filed on Aug. 17, 2023. The present application incorporates the entirety of Provisional Application No. 63/533,222 by reference.

FIELD OF THE INVENTION

The present invention relates to an apparatus and method for capturing energy from an unmanned aircraft propeller system and utilizing the energy to charge a battery. The invention further provides for a belt drive system connected to one or more propellers of an unmanned aircraft system commonly referred to as a drone aircraft. The drive system provides for a plurality of propeller or lift systems to provide the necessary lift for the drone. The belt drive system may also be linked to an alternator or dynamo such that a portion of the energy generated by the rotation force provided to the drive system of the propeller is captured by the alternator or dynamo. The present invention provides for a system where energy is captured by an alternator, dynamo or the like. The alternator or dynamo converts the mechanical energy from the belt drive to electrical energy. Electrical energy is used to replenish the charge in the battery. The unique aspect of the present invention involves the operation of a propeller drive system to generate energy for recharging the battery that supplies power to the propeller drive system of the drone. The system provides additional generated energy to power the drive systems for the propellers which provides for a longer flight duration. The generated energy may also be used to operate any of the electrical systems that may be included as part of the drone such as the central computer system, the GPS system, camera systems or any other electrical system. The present invention provides for the ability to extend the flight time of a drone. The current invention overcomes the problem by incorporating a innovative vorticular ventilator to provide a means to recapture energy while at the same time cooling the internal comments of the drone to not only extend the battery life but to extend the life of the internal components of the drone as well.

There is further a need to utilize the flow of air a drone is in flight to further generate energy which can be stored and later used to power the unit.

BACKGROUND OF THE INVENTION

There exists a problem in the drone flight industry regarding the life cycle of the batteries used to provide power to the propulsion system of a drone. Typically, a drone aircraft utilizes some type of battery system to power the propulsion system of the drone. When the battery charge is extinguished, the drone can no longer fly. Battery life is one of the most important features customers look for in a drone. The longer the battery life of a drone, the more time the drone can remain airborne to take photos and videos or fly around to inspect or explore.

There are some drones that are powered by hydrogen fuel cell or gas-powered engine technology. The present invention could be incorporated in conjunction with the hydrogen fuel cell or gas-powered systems to provide additional electrical energy to the drone or provided additional backup energy should the hydrogen fuel source or gas powered engine systems fail.

The typical flight time for most high-quality commercial drones is about 20 minutes. Lower quality drones have battery life ranging from 5 to 10 minutes while mid-range drones have flight time between 15 to 20 minutes. Professional drones have flight time between 20 to 30 minutes. Batteries can hold large amounts of power, but they can take several hours to charge up. Capacitors, on the other hand, charge almost instantly, but hold only small amounts of power. Most drones use Lithium-ion batteries; however, any type of battery may be used with the drone. Hybrid drones may significantly increase the power and efficiency of Li batteries by combining the qualities of a lithium battery with the super-fast charging of a capacitor. They promise to save a lot of weight while significantly increasing a drone's range and flight time.

There exists technology to allow for a battery pack in a drone to be recharged in flight without having the drone touch the ground. However, while ground-to-air recharging systems provide a method to recharge the drone in flight, allowing drone operators to experience extended flight times, the systems are complex and difficult to operate.

There are currently two different types of technology in the experimental stage. The first is a laser-based recharging system. In this system, drone operators shine a laser beam at specially equipped solar panels that then allow the drone to recharge. Recharging a drone with lasers has some limitations, though, such as the fact that the laser beams can be hindered by distance, rain, fog, smoke and haze. The second option uses an electromagnetic field to keep drones charged. A ground-based wire frame reminiscent of a spider's web provides an electromagnetic field that can charge a drone equipped with special antennas. These solutions do not overcome the problem of extending the flight time of the drone by using the energy of the drone.

Almost all drones regardless of their purpose or size must face the same issue: overcoming limited flight endurance. Locating a power source which can last a long time, be based on a resource that's widely available and affordable, is difficult. A power source for a drone must have a good energy-to-weight ratio, it must be environmentally friendly, create little noise or vibrations, and be quickly and easily replenished.

The problem of extending the flight time of a drone can be overcome by increasing the size of the battery which also increases the weight of the drone. In turn, the additional weight added to the drone will cause flight issues and will consume even more power to maintain the drone airborne. Others have considered implementing multiple batteries for use with the drone. However there remains the problem of having to land the drone to replace the battery. The problem of extending the flight time may be overcome by incorporating multiple batteries as part of the power system. Incorporating multiple batteries in a drone, not only adds extra weight (which is undesirable), multiple batteries incur extra cost, maintenance for the additional batteries and charging equipment.

As mentioned above, extra batteries may be added to the drone. However, the extra batteries increase the weight of the drone. The heavier the drone, the more power that will be required to propel the drone. This can influence the battery life and consequently the flight time of the drone. There is a reason why manufacturers design drones to be compact and lightweight. The lightweight, portable design of the drone not only makes the drone easier to store and transport but it also makes it easier to propel in the air for longer periods of time.

The number of motors also influences battery life. The more motors placed on a drone increases the weight and the surface area of the drone, requiring more power to keep the drone in the air. The increased number of motors placed on a drone requires more power from the battery. Manufacturers generally put the size of a drone into consideration and will typically incorporate bigger batteries in connection with bigger drones. Batteries come in different sizes for different drone models. The more powerful the battery that is used in conjunction with the drone, the longer the drone will be able to remain airborne. However, the strength of a battery's power degrades over time. The failure to properly maintain a battery will have a negative impact on the efficiency of the battery after just a couple of months.

Apart from the weight of a drone, the weight of any add-on installed on the drone will also affect the flight time. Most users of a drone install accessories on the drone such as a camera, sensor, recorder, or other gadgets. The add-ons add to the weight of the drone and require increased power from the battery to keep the drone in the air. The result of the increased weight is that the battery drains faster, and the battery life/flight time is reduced.

Drone users have attempted to overcome these problems by upgrading the quality of the battery installed on the drone, fly in only the optimal flight conditions (calm, sunny days), utilize extra batteries, reduce the number of accessories on the drone and operate the drone in the proper flight mode. All of these factors conserve and help reduce power consumption which increases flight time. However, the optimal operation of the drone is not implanted with the methods used to overcome the battery problem.

The present invention addresses the need for increased flight time of a drone while not increasing the weight of the drone significantly. The present invention will operate to overcome the problem of adding batteries and increasing the weight of the drone. There is a need to incorporate an apparatus and method for capturing energy from a drone propeller system to utilize the energy to charge a battery.

SUMMARY OF THE INVENTION

The present invention relates to an apparatus and method for capturing energy from a drone propeller to utilize the energy to charge a battery. The invention further provides for a belt drive system connected to one or more propellers of a drone aircraft.

On of the advantages provided by the present invention includes a belt drive system linked to an alternator or dynamo such that a portion of the energy generated by the rotation of the propeller is captured by the alternator or dynamo. The present invention provides for a system where the energy is generated by an alternator or dynamo to supply electrical energy to the battery packs.

Another advantage of the present invention includes a storage pack for storing the energy generated by the alternator or dynamo.

The alternator or dynamo of the present invention operates to convert the mechanical energy from the belt drive to electrical energy. The electrical energy is used to replenish the charge in the battery. The unique aspect of the present invention involves the operation of the propeller drive system to generate energy for recharging the battery that supplies power to the propeller drive system of the drone.

Yet another advantage that can be seen in one of the embodiments of the present invention is that the system utilizes one or more motors to operate more than one propulsion system. The present invention operates to include one or more belts, driven by a motor, that functions to provide the propulsion energy to a series of propulsion systems. The system of serpentine belts provides that a failure of one motor or belt does not cut off power to all the propulsion systems.

Yet, another advantage of the invention is to provide an auxiliary recovery system to capture additional energy, while at the same time providing a method of cooling the internal components of the drone such as the rechargeable battery pack, the dynamo, alternator, generator and the propeller motors. The present invention utilizes a vorticular ventilator that operates to rotate, when the drone is in flight, through the wind and movement of the drone through the air. The rotation of the blades imparts a force on the vorticular ventilator that causes the blades of the vorticular to rotate. As the blade rotates the is a rotational force imparted on a shaft of the blade which operates to transmit the rotational force upon a dynamo, alternator or generator. The rotational force generates energy through the dynamo, alternator or generator. The blades further operate to move the air by pushing or changing direction of the air to create an airflow through the internal portion of the drone. The airflow operates to cool the internal components of the drone.

While one or more of the advantages of the present invention can be seen in the above summary of the invention, it should be understood that all of the advantages of the present invention will be shown and understood in the drawings and detailed description of the preferred embodiment of the invention set forth below.

BRIEF DESCRIPTION OF THE DRAWINGS

Various embodiments of the present invention are disclosed and described in detail herein with reference to the drawings attached to this application, wherein:

FIG. 1 shows a side view of the energy recovery system installed on a drone in accordance with the principles of the present disclosure;

FIG. 14 is a is a perspective view of an embodiment of the present invention depicting the vorticular ventilator at the upper portion of passenger drone.

FIG. 16A is a perspective view of an embodiment of the present invention depicting the vorticular ventilator having scooped-style contact surfaces.

FIG. 16B is a perspective view of an embodiment of the present invention depicting the vorticular ventilator having z-shaped, stepped leading edge fan blade style contact surfaces.

FIG. 17 is a perspective view of an embodiment of the present invention depicting the vorticular ventilator with the z-shaped blade.

DETAILED DESCRIPTION OF THE
PREFERRED EMBODIMENTS OF THE
INVENTION

Figure 1:
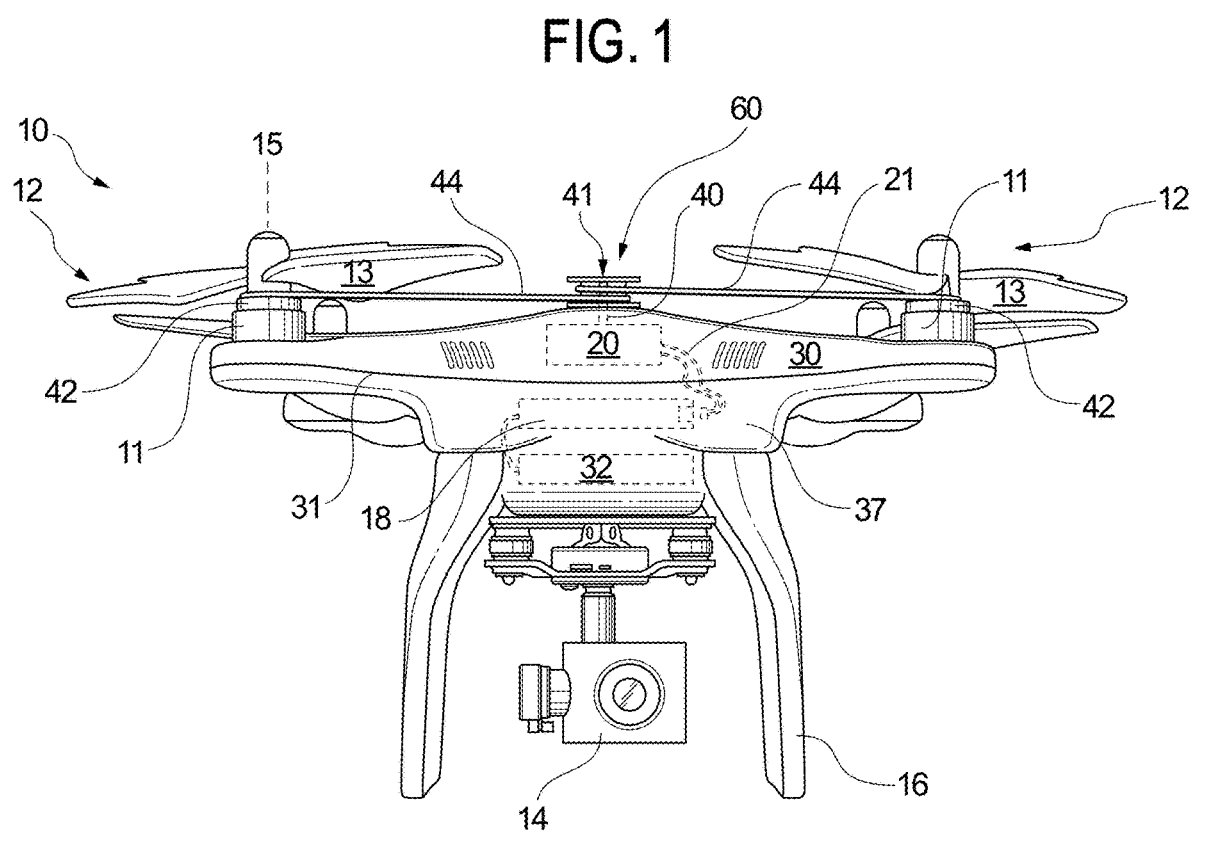
Figure 3:
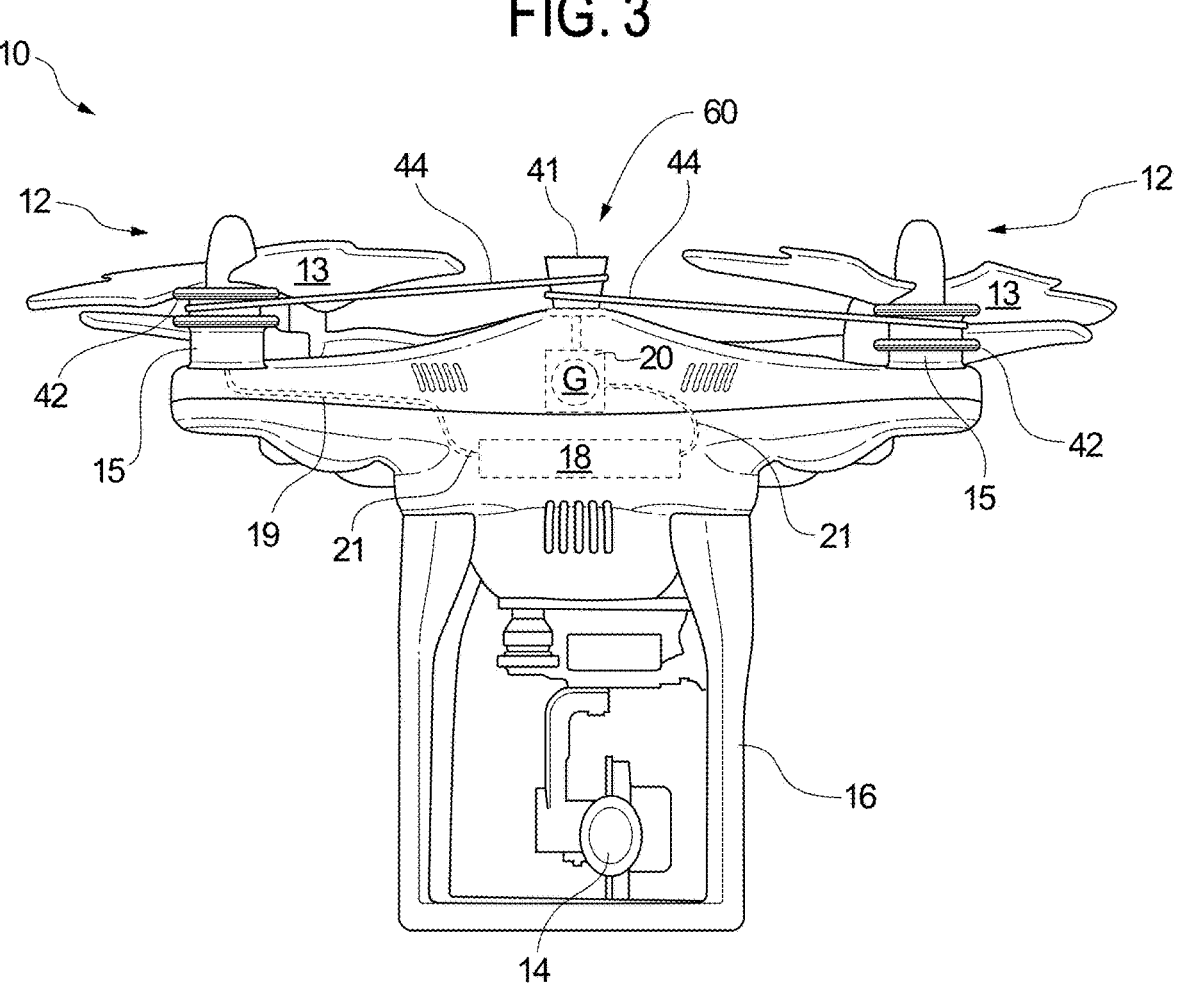
FIG. 3 shows a side view of the energy recovery system installed on the exterior of a drone in accordance with the principles of the present disclosure.

As can be seen from the drawings, the present invention embodies a charging system that operates to recharge the battery packs and extend the battery life of the battery packs during the flight of the drone. FIGS. 1 and 3 show a typical drone 10 in a side view that includes the energy recovery system 20 of the present invention. FIGS. 1 and 3 show an embodiment of the present invention including a schematic of the mechanism of the energy recovery system. The drone 10 typically has a plurality of propellers 12 with each propeller 12 having a number of blades 13. The drone is shown with an accessory camera 14 and landing gear 16.

Figure 2:
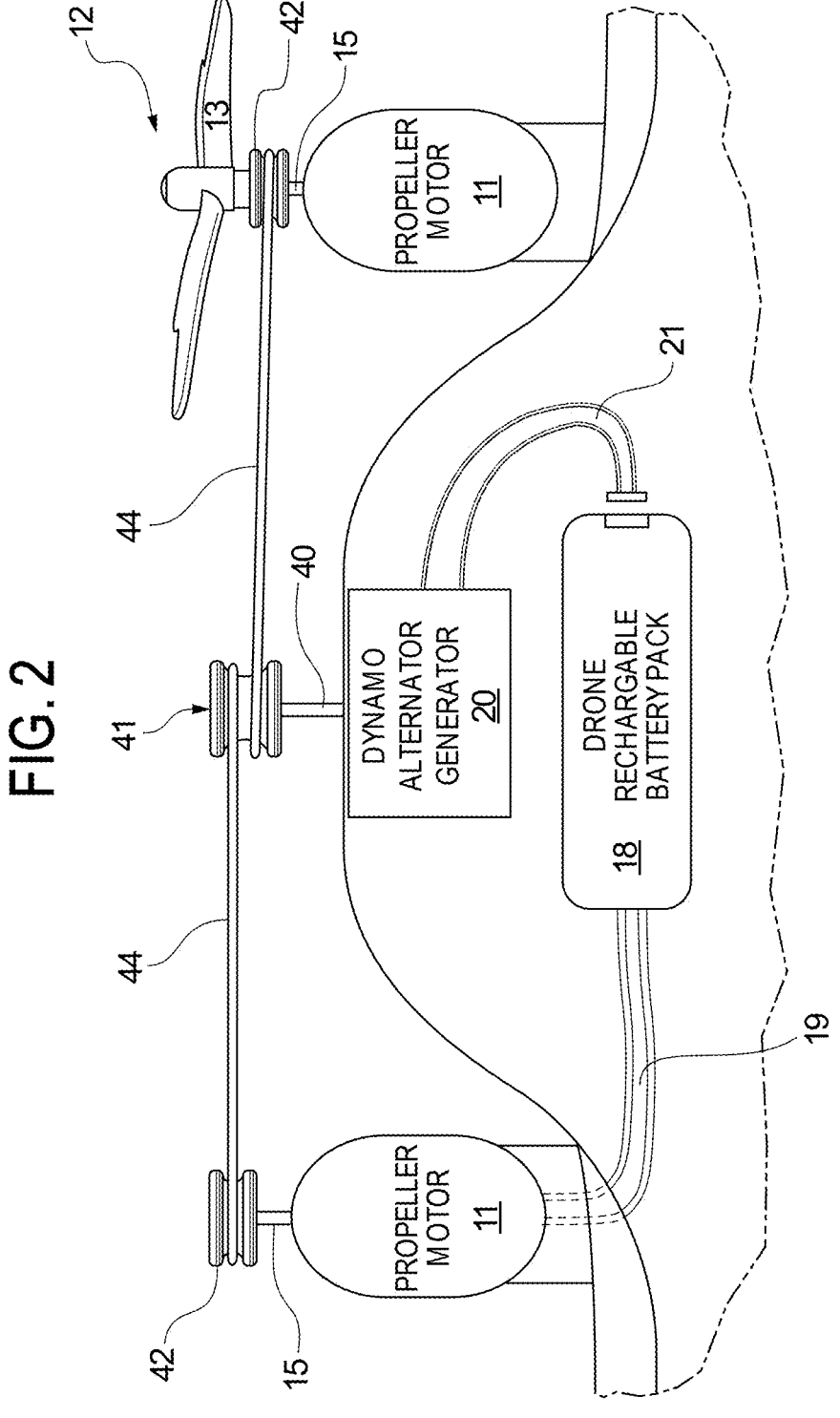
FIG. 2 shows a side view the mechanism of the energy recovery system in a drone in accordance with the principles of the present disclosure.

The drone 10 of one embodiment of the present invention as shown in FIGS. 1 through 3, includes a plastic housing 30 and four propellers 12. The drone has a center of gravity positioned within housing 30. The drone 10 has a landing gear 16 positioned below the center of gravity 31. The propellers 12 of the drone 10 are positioned outside the plastic housing 30 above the center of gravity 31.

Located inside the plastic housing 30 is a power source or battery pack 18 positioned near the center of gravity 31 of the drone 10. The battery pack 18 typically comprises the majority of the weight of a drone 10. The center of gravity 31 is a critical factor in the stability and maneuverability of a drone 10. If the center of gravity 31 is not located in the correct position, the aircraft may become unstable and difficult to control. For example, if the battery pack 18 was not positioned near the center of gravity 31, the drone 10 would become unstable due the positioning of the battery pack 18. If the battery pack 18 is positioned above the geometric center of gravity 31, the drone 31 may be caused to tip over more easily and become unstable. There will be a gravitational torque on the drone 10 when the drone is rotated during operation. The further the battery pack 18 is located from the center of gravity 31, the smaller the angle must be to the position where the drone 10 will start to invert. Similarly, if the mass of the battery pack 18 is positioned below the center of gravity 31 of the drone 10, the drone 10 will have a larger angle of inclination before the drone tends to flip thus making it harder to flip the drone 10.

The battery pack 18 may include a energy recovery system 20 and is configured to supply electrical power to motor 11 of the propellers 12. There may be a single battery unit in the battery pack 18 or the battery pack 18 may comprise of a plurality of batteries. The batteries of a drone system typically are comprised of lithium-ion batteries, however, it should be understood that any type of batteries and battery systems can be utilized. One skilled in the art will recognize that the number of batteries increase the weight of the drone 10. There is an efficiency between the number of batteries in the battery pack 18, giving the drone a greater length of flight and the weight of the drone 10, which decreases the length of time a drone can stay in flight. One of skill in the art will understand how to optimize the number of batteries used in the battery pack 18 of the drone 10 for the intended application of the drone and determine whether the battery pack 18 should include one battery or multiple batteries.

The battery pack 18 is configured to supply electrical power to the motors 11 which power the propellers 12. There is also a central control mechanism 32 in the drone that operates the various systems and controls the flight operations of the drone 10. The central control mechanism 32 is typically a CPU computer chip that operates as a control system. While the application discusses a CPU, it should be understood by a person pf skill in the art that a Microcontroller (MCU) or a Digital Signal Processor (DSP) could be used in place of a CPU without effecting the function and operation of the present invention. The flight control operation function of the central control mechanism 32 comprises a series of sensors and flight control mechanisms and components play a crucial role in the navigation of a drone 10. By analyzing data from various sensors, the flight controller portion of the central processing mechanism operates to determine the orientation and position in space of the drone 10. The information gathered from the sensors is then used to adjust the yaw, throttle, and other controls to influence the movement of the drone 10. Altitude and propeller 12 operation also come into play for stable flight, ensuring smooth and controlled movements. The drone controller 50 acts as the intermediary between the pilot and the drone 10, relaying commands and executing specific movements.

The control mechanism 32 of the drone 10 is operated by a remote drone controller 50, whereby the operation of the remote drone controller 50 sends a signal to the control mechanism 32 which signals and controls the plurality of propellers 12 that operate the drone. The control mechanism 32 is positioned within housing 30. The drone control mechanism 32 typically communicates with the control mechanism through radio communication. Radio frequencies play a crucial role in enabling communication between the control mechanism 32 of the drone 10 and the remote drone controller 50. Different frequency bands are used for drone control, each with its own advantages and limitations. Lower frequencies, for example, allow for a longer range but may be susceptible to interference. Radio frequency identification (RFID) can be employed to enhance security in drone communication. RFID technology lets the control mechanism 32 of the drone 10 and the remote drone controller 50 to establish a secure and authenticated connection. Navigating the electromagnetic spectrum and selecting the appropriate frequency band for reliable and efficient drone control is important. The range of a remote drone controller 50 depends on factors such as frequency, power, and interference. With advancements in technology, newer drones can now maintain a connection up to several miles away from the controller. Remote drone controller 50 may include mobile apps that provide real-time information about the distance and position of the drone 10.

Figure 4:
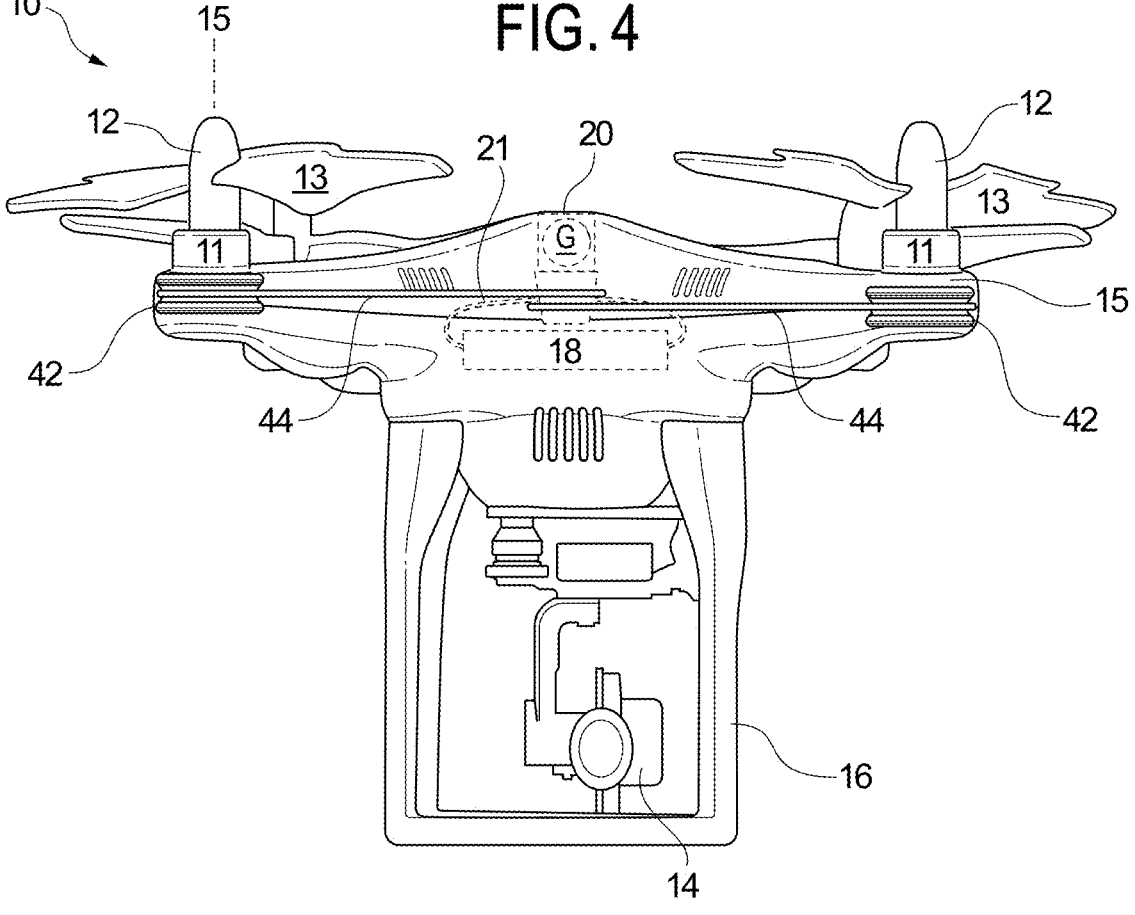
FIG. 4 shows a side view of the energy recovery system installed on the interior of the housing of a drone in accordance with the principles of the present disclosure.

FIGS. 1 through 3, 5 show the drone of the present invention with the belt system of the energy recovery apparatus located outside the housing 30 of the drone. FIG. 4 shows the belt system of the energy recovery apparatus located inside housing 30 of the drone. As shown in FIGS. 1 through 3, drone 10 of the present invention includes energy recovery system 20 which may include an alternator, dynamo or other type of energy capturing system. The energy recovery system 20 is positioned within the housing 30 of the drone 10. It should be understood by those of skill in the art that the energy recovery system 20 may include an alternator, an embedded inverter, a dynamo or a direct current generator. The important feature of the energy recovery system 20 is that the system operates to recover energy that is produced by the rotation of motor 11 or the propeller 12. The energy recovery system 20 is configured in a manner to supply power to battery pack 18. The energy recovery system 20 may also be configured to directly supply energy to the motors 11 of the drone. In one embodiment the energy recovery system 20 would comprise of a dynamo, alternator or other electrical generating device that would supply electrical power to the motors.

A dynamo is an electrical generator that creates direct current using a commutator. The electric dynamo uses rotating coils of wire and magnetic fields to convert mechanical rotation into a pulsing direct electric current through Faraday's law of induction. A dynamo mechanism consists of a stationary structure, called the stator, which provides a constant magnetic field, and a set of rotating windings called the armature which turn within that field. The motion of the wire within the magnetic field creates an electromotive force pursuant to Faraday's law, which pushes on the electrons in the metal, creating an electric current in the wire. On small machines, the constant magnetic field may be provided by one or more permanent magnets; larger machines have the constant magnetic field provided by one or more electromagnets, which are usually called field coils. A commutator is needed to produce direct current. When a loop of wire rotates in a magnetic field, the magnetic flux through the field reverses with each half turn, generating an alternating current. Batteries typically run on direct current. The commutator is essentially a rotary switch. It consists of a set of contacts mounted on the machine's shaft, combined with graphite-block stationary contacts, called "brushes." The commutator reverses the connection of the windings to the external circuit when the potential reverses—so instead of alternating current, a pulsing direct current is produced. Dynamos may be used to recharge batteries.

An alternator is an electrical generator that converts mechanical energy to electrical energy in the form of alternating current. For reasons of cost and simplicity, most alternators use a rotating magnetic field with stationary armature. Occasionally, a linear alternator or a rotating armature with a stationary magnetic field is used. In principle, any AC electrical generator can be called an alternator, but usually the term refers to small rotating machines driven by automotive and other internal combustion engines. A conductor moving relative to a magnetic field develops an electromotive force (EMF) in it. This EMF reverses its polarity when it moves under magnetic poles of opposite polarity. Typically, a rotating magnet, called the rotor turns within a stationary set of conductors wound in coils on an iron core, called the stator. The field cuts across the conductors, generating an induced EMF as the mechanical input causes the rotor to turn.

A DC generator is an electrical machine which converts mechanical energy into direct current electricity. This energy conversion is based on the principle of production of dynamically induced EMF. According to Faraday's laws of electromagnetic induction, whenever a conductor is placed in a varying magnetic field, an EMF gets induced in the conductor. The magnitude of induced EMF can be calculated from the emf equation of dc generator. If the conductor is provided with a closed path, the induced current will circulate within the path. In a DC generator, field coils produce an electromagnetic field, and the armature conductors are rotated into the field. Thus, an electromagnetically induced EMF is generated in the armature conductors.

The present invention contemplates the ability to recharge one or more batteries in battery pack 18 based upon the rotational force of one or more of the propellers 12 and the propeller motor 11. While the application may use the term "alternator," it should be understood that the invention contemplates using either a generator, alternator or dynamo without departing from the spirit of the invention. Thus, when the inventor uses the term "energy recovery system," the term could be replaced with the term dynamo, generator or other energy conversion devise without losing context of the disclosure.

The energy recovery system 20 is configured to supply electrical power, either in the form of Alternating Current (AC) or Direct Current (DC), to the existing embedded drone power supply or battery pack 18. In one embodiment of the present invention, motors 11 are powered by a battery pack 18 which may consist of rechargeable batteries. The motors 11 may be powered by a single battery pack 18 or each of the motors 11 may be connect to its own battery pack 18, not shown. The motors 11 are electrically connected to the battery pack 18 though an electrical connector 19. The battery pack 18 supplies electrical power to the motors 11. While the system of the preferred embodiment shows the energy recovery system supplying power to the battery pack 18 which supplies power to the motors 11, the invention could include an alternative battery system apart from the battery pack 18 which is charged by the energy generated from the energy recovery system 20. In the alternative embodiment, the energy recovery system 20 supplies energy to the alternative battery pack which in turn supplies stored power to the motors 11. The motors 11 are powered by the battery packs 18 and or the alternative battery system.

As shown in FIGS. 1 through 4, the present invention includes a belt system 44 that includes one or more propeller hubs 42 and drive pulley 41. The drive pulley 41 is driven by one or more of the propeller hubs 42 that are connected to motor 11. Each propeller motor 11 has a drive shaft 15 upon which the propeller 12 is mounted. The present invention includes one or more drive pulley belt(s) 44 mounted to the drive pulley 41. Each propeller system comprises a propeller hub 42 positioned at each of the propeller motor drive shaft 15 and a belt system 44 positioned between the drive pulley 41 and the propeller hub 42 mounted on the propeller drive shaft 15. For example, on the first propeller, there is a propeller hub 42 mounted on the propeller drive shaft 15. There is a belt system 44 that is positioned between the pulley hub 42 on the propeller drive shaft 15 and the drive pulley 41 such that when the propeller drive shaft 15 rotates, the rotational movement of the shaft causes the propeller hub 42 to rotate, thus moving the belt system 44.

The propeller 12 also includes a propeller pulley 42 which cooperates with the motor 11. As the belt system 44 rotates it operates to move the drive pulley 41. The drive pulley 41 is connected to a drive shaft 40, wherein the rotation of the drive shaft 40 operates to affect the energy charging system 20.

The energy recovery system 20 includes a drive shaft 40. The drive shaft 40 rotates due to the force imparted upon the drive pulley 41 by the belt system 44 to impart power or energy into the energy recovery system 20. The drive pulley 41 can be configured to coordinate with either an alternator, dynamo or generator as part of the energy recovery system 20 such that the rotation of the propeller hub 42 of one or more propellers 12, causes the movement of the belt system 44 coordinating with the propeller 12, which in turn imparts a rotational force on the drive pulley 41 that rotates the shaft 40 of the alternator, dynamo or generator of the energy recovery system 20 which causes the alternator to accumulate an electrical charge. The drive shaft 15 of the propeller motor 11 operates to rotate a hub 42 that contacts the belt system 44, wherein the belt system 44 creates the electric generating force on dynamo or generator the energy recovery system 20. The system may include a propeller hub 42 and belt system 44 which rotate simultaneously from the hubs 42 of each propeller 12 creating unified movement of the drive pulley 41 to generate a rotation force on the drive shaft 40 providing the rotation force tot the alternator of the energy recovery system 20. The alternator of the energy recovery system 20 is connected to the drone battery pack 18 which comprises rechargeable batteries. The alternator of the energy recovery system 20 operates to provide power to the battery pack 18 as the drone's propellers 12 are operated. Thus, during flight, the rotational movement of the propellers 12 and the propeller hubs 42 function to move a belt system 44 and impart the rotational force upon the drive pulley 41. The rotational force causes the alternator to rotate coils of wire and magnetic fields to convert mechanical rotation into a pulsing direct electric current. The current is directed to the battery pack 18 through a wire harness 21 connected to the battery pack 18.

FIG. 2 shows a schematic of the internal mechanism of the energy recovery system 20 of the current invention. The figure shows the propellers 12 connected to the propeller hub 42 that operates to drive the belt system 44. The energy recovery system 20 is shown cooperating with the drive shaft 40 connected to the drive pulley 41 connected to the belt system 44. The belt drive and recovery system 60 as shown in FIG. 2 may be configured such that the propeller hubs 41, belt system 44 and drive pulley 41 are positioned outside the housing 30 of the drone 10 as depicted in FIGS. 1 and 3. Alternatively, the belt drive and recovery system 60 as shown in FIG. 2 may be configured such that the propeller hubs 41, belt system 44 and drive pulley 41 are positioned internal to the housing 30 of the drone 10 as depicted in FIGS. 4.

While the embodiment of FIGS. 1 and 3 shows the alternator being charged by a belt drive and recovery system 60 positioned outside the housing of the drone 10, the belt drive and recovery system 60 could easily be positioned inside the housing 30 of the drone 10 without impacting the function and operation of the energy recovery system 20. For example, FIG. 4 shows an embodiment where the belt system 44 is located in the housing 30 of the drone 10. The system operates in the same manner as described above. The belt system 44 is driven by one or more of the plurality of propellers 12. The propeller motor 11 has a drive shaft 15 upon which the propeller 12 is mounted. The propeller is located outside the housing 10. The present invention includes a propeller hub 42 mounted to the drive shaft 15 below the propeller 12. The propeller hub 42 is positioned inside the hosing 10. The system comprises a dual pulley, a propeller hub 42 positioned at each of the propeller motor shafts 15 and a belt system 44 positioned between the drive pulley 41 and the propeller hub 42 are all encased in the housing. For example, on the propeller 12, there is a propeller hub 42 mounted on the propeller drive shaft 15. There is a belt system 44 that is positioned between the propeller hub 42 on the drive shaft 41 such that when the propeller drive shaft rotates 15, the rotational movement of the shaft 15 causes the propeller hub 42 to rotate, thus moving the belt system 44. As the belt system 44 rotates and operates to move the drive pulley 41.

FIG. 4 depicts energy recovery system 20 including a drive shaft 40 in which the drive shaft is positioned internal to the housing 30. The drive shaft 40 rotates due to the force imparted upon the drive pulley 41 by the belt system 44 to impart power or energy into the energy recovery system 20. The drive pulley 41, propeller hub 42 and the belt system 44 are all positioned internal to the housing 30. In this embodiment, the drive pulley 41, propeller hub 42 and the belt system 44 are not exposed outside of the drone 10 housing 30 which provides an added layer of protection to the components. The drive pulley 41 can be configured to coordinate with either an alternator, dynamo or generator as part of the energy recovery system 20 such that the rotation of the propeller hub 42 of one or more propellers 12, causes the movement of the belt system 44 within the housing 10 coordinating with the propeller 12 located outside the housing 10. Rotation of the propellers 12, propeller hubs 42 and belt system 44 imparts a rotational force on the drive pulley 41 that rotates the shaft 40 of the alternator, dynamo or generator of the energy recovery system 20 which causes the alternator to accumulate an electrical charge. The propeller hubs 42, belt system 44 and drive pulley 41 are all positioned internally within housing 30. The drive shaft 15 of the propeller motor 11 operates to rotate a propeller hub 42 that contacts the belt system 44, wherein the belt system 44 creates the electric generating force on dynamo or generator the energy recovery system 20 of the alternator. The system may include a propeller hub 42 and belt system 44 which rotate simultaneously from the hubs 42 of each propeller 12 creating unified movement of the drive pulley 41 to generate a rotation force on the drive shaft 40 providing the rotation force tot the alternator of the energy recovery system 20. The alternator of the energy recovery system 20 is connected to the drone battery pack 18 which comprises rechargeable batteries positioned internal to the housing 30. The alternator of the energy recovery system 20 operates to provide power to the battery pack 18 as the drone's propellers 12 are operated. Thus, during flight, the rotational movement of the propellers 12 and the propeller hubs 42 function to move a belt system 44 and impart the rotational force upon the drive pulley 41. The rotational force causes the alternator to rotate coils of wire and magnetic fields to convert mechanical rotation into a pulsing direct electric current. The current is directed to the battery pack 18 through a wire harness 21 connected to the battery pack 18.

Figure 5:
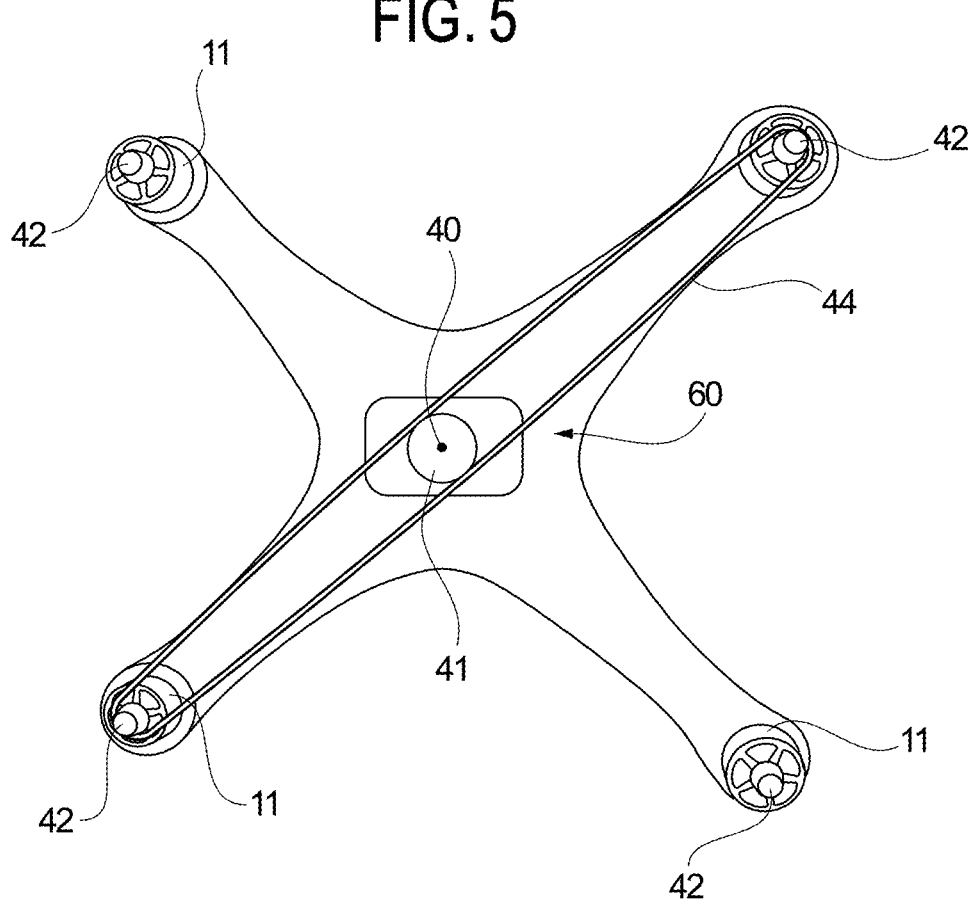
FIG. 5 shows the top view of the energy recovery system installed on the exterior of a drone in accordance with the principles of the present disclosure.

As shown in FIG. 5, the present invention utilizes a belt drive and recovery system 60 to transfer the mechanical energy generated by the rotational force of the propeller 12 to an energy recovery system 20. The belt drive and recovery system 60 has a propeller hub 41 mounted on the shaft 15 of the propeller motor 11 between the motor 11 and the propeller [not shown] mounted to the drive shaft 15. The propellers 12 are shown disconnected form the drive shaft so that the pulley hub 42 may be seen. The belt drive and recovery system 60 further includes a drive pulley 41 on the drive shaft 40 that operates to impart a rotation force on the energy recovery system 20. The rotational force of the propeller hubs 42 impart a force on the belt system 44 in such a manner to rotate the drive pulley 41 located on the drive shaft 40 of the energy recovery system 20.

The belt system 20 is a frictional drive that transmits power between two or more shafts using propeller hub 42 and the drive pulley 41. The belt system 20 comprises an elastic belt. It should be understood that the belt system is made of an elastic belt that comprises either rubber, urethane material, leather, plastic or other similar material. In most cases, the belt system 20 is powered by friction, but it may also be a positive drive. The belt drive can operate at wide ranges of speed and power requirements. It is also highly efficient.

A belt drive and recovery system 60 shown in FIG. 5 is considerably cheaper than gear and chain drives. It costs less to install as well as maintain. Belt drive sheaves or pulleys undergo little wear compared to chain drive sprockets over extended periods of use. Contrary to most chain and gear drives, a belt drive can handle some degree of misalignment. Correct alignment, however, increases service life. Excessive misalignment is responsible for issues such as improper belt tracking, uneven pulley wear, noisy operation and belt edge wear. The intensity of these issues is directly proportional to the belt's width. Belt tracking refers to the belt's ability to be centrally located on the pulley and not shift to either side when in operation. Crowned pulleys can alleviate belt tracking issues. It is also worth noting that a belt drive usually reduces shaft speed. For this reason, the driving pulley is usually smaller than the driven pulley. This provides a greater wrap angle on the driven pulley which is beneficial in friction-based drives. Designers may also use an idler pulley to increase the wrap angle and to maintain the recommended belt tension.

The system of the current invention contemplates the use of any of the following belt drive systems: open belt drive, cross belt drive, jockey pulley drive or compound belt drive. The open belt drive includes two or more pulleys are connected with a belt wrapped around them. When power is supplied to the driving shaft, it rotates the driving pulley. The belt moves with it and rotates one or more driven pulleys. In an open belt drive, both pulleys rotate in the same direction. With a horizontal pulley arrangement, the tight side of the belt is at the bottom and the slack side is at the top to increase the belt's angle of contact with the pulleys.

There are many types of belt systems 20 contemplated for use in the present invention. The first type of belt that could be used in the present invention is the flat belt. Flat belts have a rectangular cross-section and rest on top of flat pulleys for operation. They transmit power from one or both sides depending on the design.

A leather belt was originally used in flat belt applications. But over time, with the discovery of new materials such as rubber and synthetic polymers, the use of leather belts has somewhat diminished. Flat belts work best with crowned or tapered pulleys.

The next type of belt is a V belt. A V belt has a trapezoidal (V-shaped) cross-section that fits into a similar groove on pulleys and sheaves. As V belt drives have a larger contact area between the pulley and the belt section, they can transmit greater power for the same dimensions.

V belts are excellent at transferring motion, they have some limitations. For example, belt slip cannot be eliminated in any of them. In applications where having no slip is a requirement, the next type of belt, or tooth belts, work best. A toothed belt is a positive transfer belt that does not need friction for power transfer. It transfers force via teeth similar to chain or gear drives but with much lower noise levels and without the need for excessive lubrication.

A link belt could also be used. A link belt is a special belt type that consists of many individual links. These links can be attached and detached as needed to change the length of the belt. The links are typically made from polyurethane and reinforced by a multilayer woven polyester fabric.

The alternator or generator includes an alternator shaft. The shaft rotates to impart power or energy into the alternator. The dual pulley belt drive can be mounted on an alternator or generator shaft such that the rotation of the belt imparts a rotational force on the shaft of the alternator which causes the alternator to build a charge. The alternator is connected to the drone rechargeable battery pack. The alternator operates to provide power to the battery as the drone's propellers are operated.

FIG. 5 shows a view of the present invention from the top. The belt drive and recovery system 60 is shown. The first propeller motor 1, a propeller hub 42 with a belt system 44 that drives the drive pulley 41. The belt system 44 is positioned between the propeller hub 42 of the first motor shaft 15 and the drive pulley 41 on the dynamo shaft. The second propeller motor 11 also has a propeller hub 42 with a belt system 44 that drives the drive pulley 41. The belt system 44 is positioned between the propeller hub 42 of the second motor shaft 15 and the drive pulley 41 on the dynamo shaft. The rotation of the first motor 11 and the second motor 11 operate to rotate the drive pulley 41 on the dynamo. The belt system moves in such a manner that the rotational force is transmitted to the dynamo whereupon the rotational energy is converted to electrical energy. Electrical energy is used to power the battery pack 18. The battery pack 18 delivers power to the motors 11.

In general, FIGS. 1 through 5 depict the features of the drone alternator system. The embodiment shows a first and second propeller. The first and second propeller consists of a motor, a propeller shaft and a propeller. The system of the present invention includes a pulley hub mounted on the propeller shaft in proximity to the propeller. It is important to note that the pulley hub must be positioned in such a way that that the pulley hub does not interfere with the operation of the propeller. The same is true of the belt. The belt is configured to engage the hub on the propeller shaft at one end and a pulley hub located in proximity to the alternator. The alternator has a shaft and a dual pulley attached to the drive shaft. The second propeller also includes a pulley hub mounted on the propeller shaft in proximity to the propeller. The belt of the second propeller is configured to engage the hub on the second propeller shaft at one end and a pulley hub located in proximity to the alternator.

Rotational movement of the first and second propeller motors imparted on the hubs positioned on the first drive shaft of the first propeller and the second drive shaft of the second propeller operate to rotate the first belt and the second belt around the dual pulley hub of the alternator. The first and second belts impart a rotational force causing the dual pulley to rotate and generate electrical current within the alternator. The alternator directs the charge to the battery through a wire harness positioned between the alternator and the battery.

Figure 6:
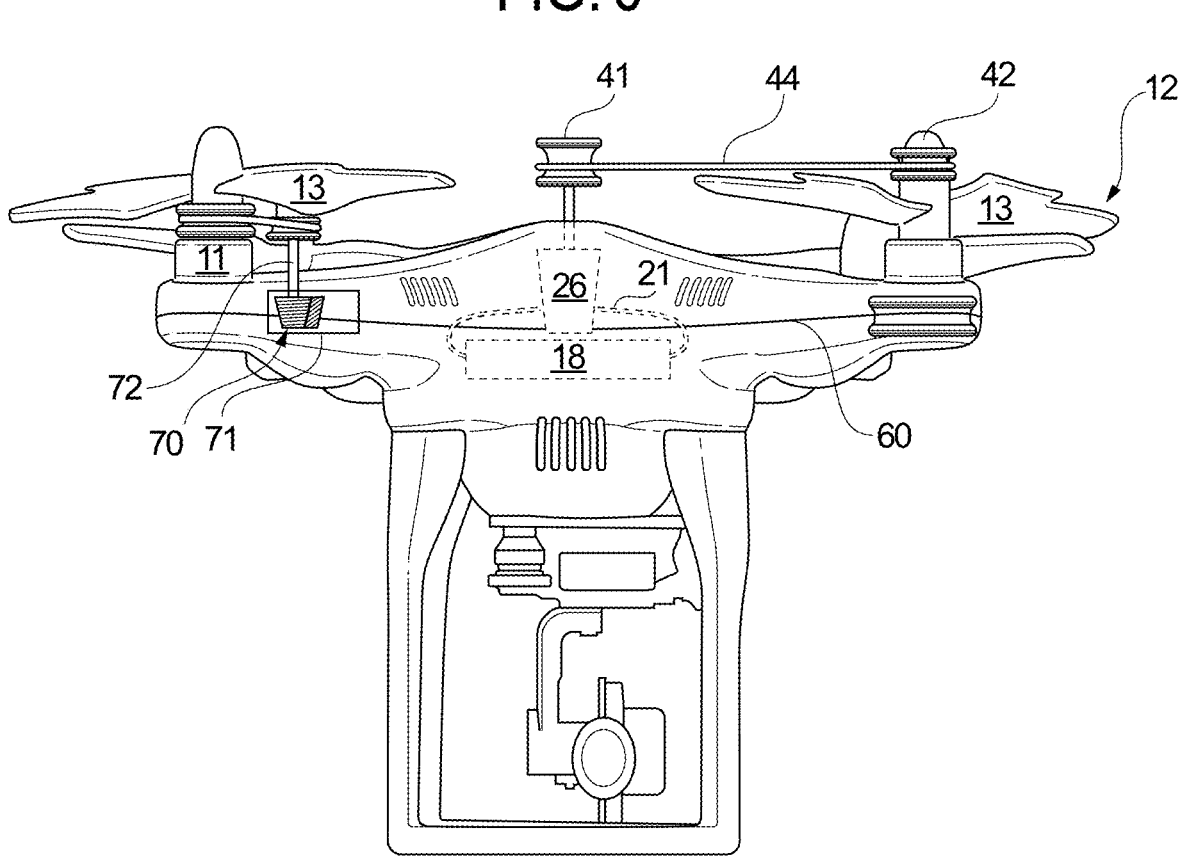
FIG. 6 shows an alternative embodiment of the energy recovery system installed in a drone.

Alternatively, as shown in FIG. 6, there could be a generator 26 included as part of the energy recovery system 20 associated with each of the propeller motors 11. The embodiment could utilize a built-in hub generator 26 mounted in association with the propeller shaft 15 or motor 11 wherein the rotation of the propeller shaft 15 or motor 11 operates to impart a rotational force on the generator 26 to generate a charge which is delivered to the battery pack 18. In other words, there may be a gear drive 70, rather than the belt system 44, shown in FIGS. 1 through 4, which directly imparts the rotational force on the generator 26 without the need for propeller hub 42 and dual drive pulley 41. Likewise, a system of gears 71 and rods 72 could be used in place of the belt drive and recovery system 60 described above without departing from the spirit of the invention. The gear drive provides a rotational force on the gears 71 and rods 70 to impart a rotation force on the generator 26 whereby the generator 26 creates electrical energy that can be used to charge a battery pack 18 or provide electrical energy directly to the motor 11.

Figure 7:
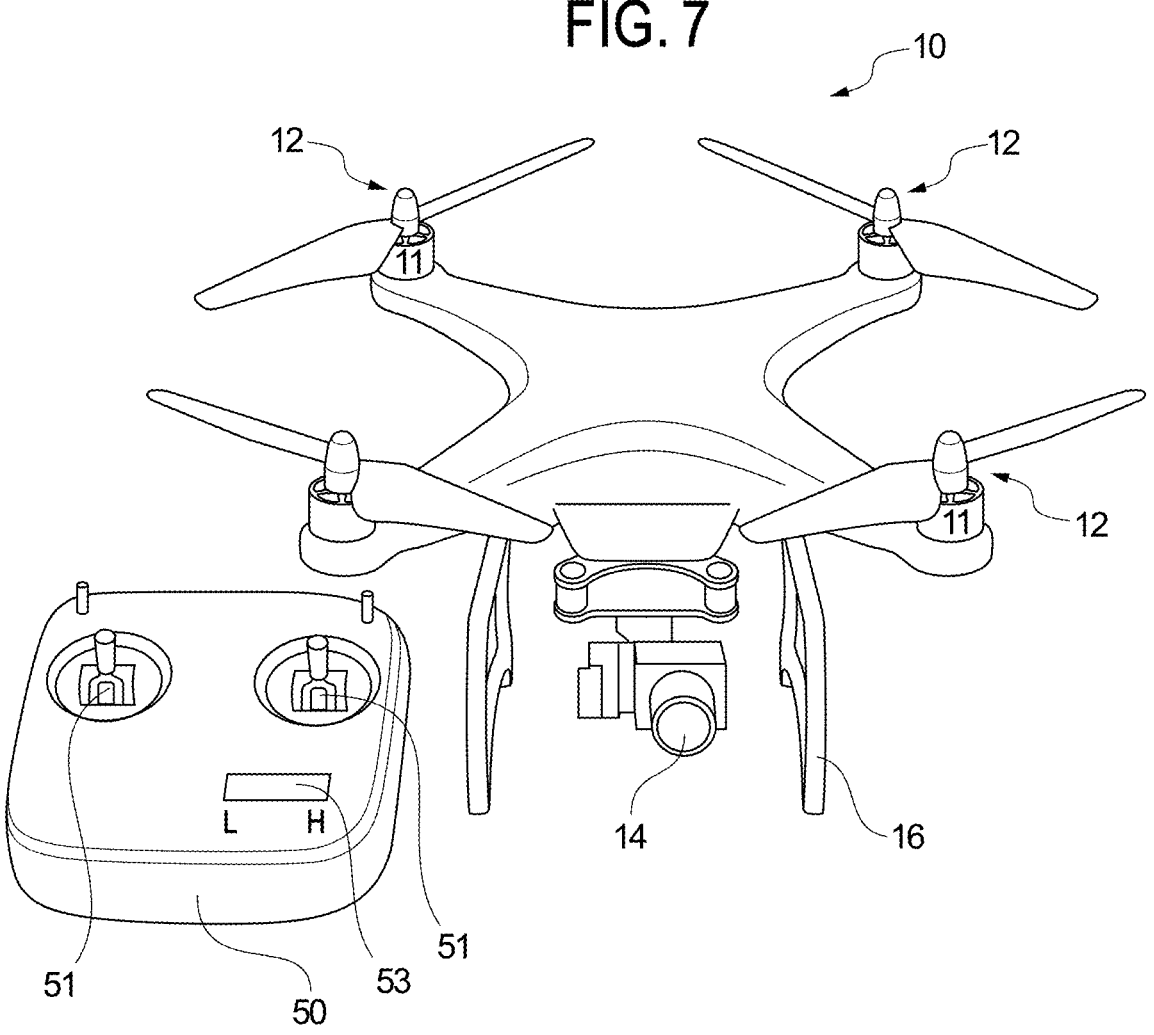
FIG. 7 shows a perspective view of the drone in accordance with the principles of the present disclosure depicting a control mechanism of the drone including a power level indicator for the battery.

FIG. 7 depicts the drone 10 and a remote drone controller 50 of the drone 10. The remote drone controller 50 includes a set of control sticks 51 to altitude, speed and direction of the drone 10. The remote drone control 50 also includes a video screen 52 to display images from the camera 14 mounted to the drone 10. The remote drone control further includes an LED indicator 53 on the remote drone control 50 for the drone 10. The LED indicator 53 will monitor the system verifying its performance by indicating the level of the charge on the battery. The battery pack 18 is shown along with a charger 54.

Figure 8:
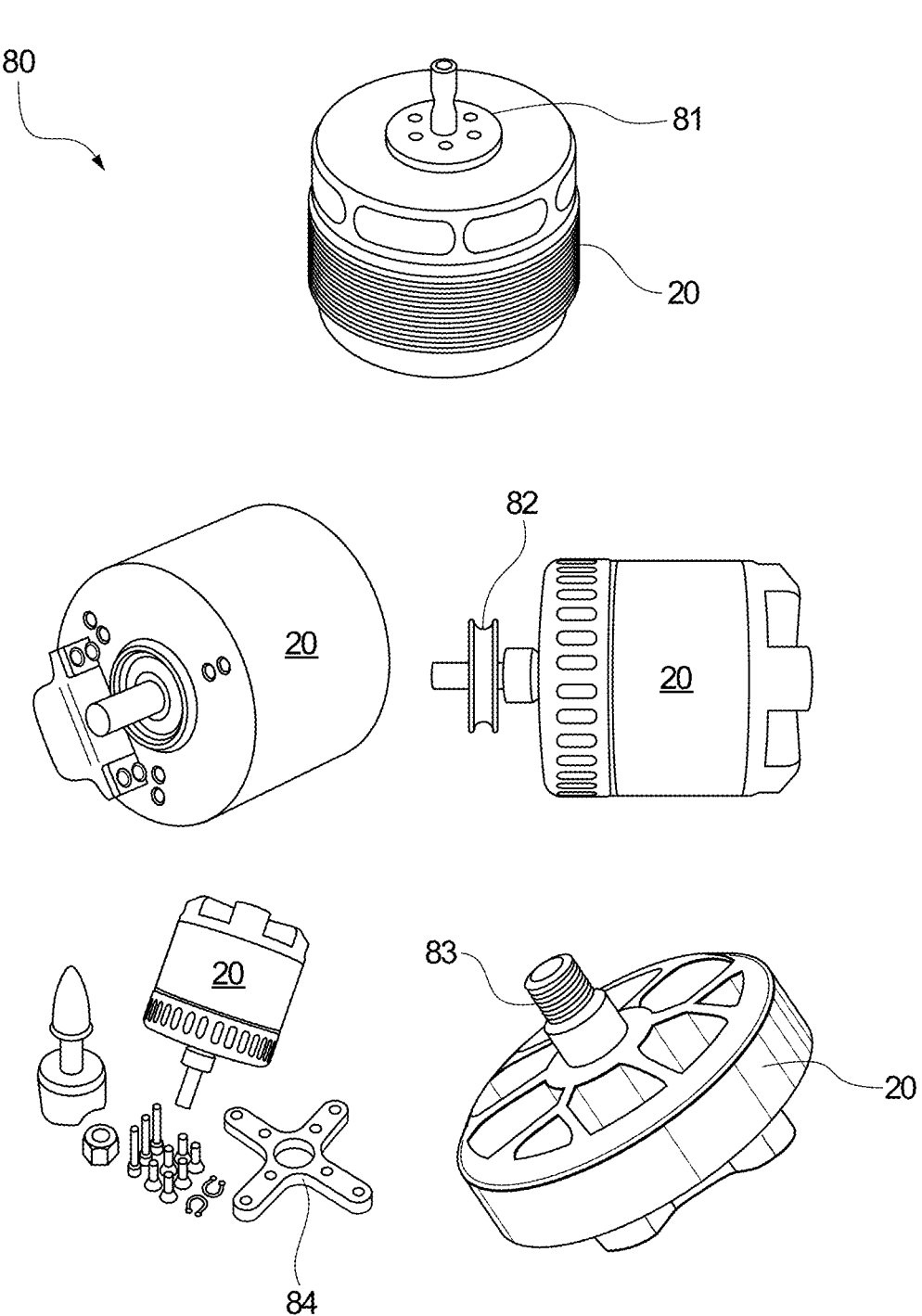
FIG. 8 shows alternators and dynamos for use in the energy recovery system of the present invention.
Figure 9:
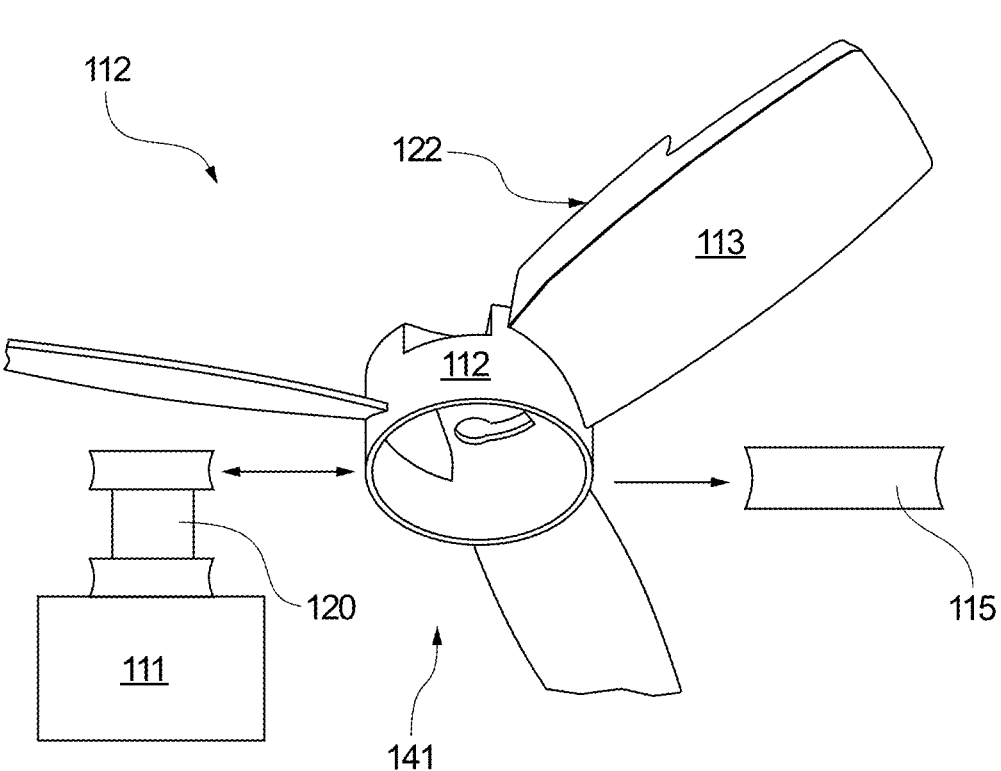
FIG. 9 shows a dynamo built into the hub of a propeller for use in the present invention.

FIG. 8 shows the various dynamos and alternators 80 that can be used in drone 10. The various drive pulleys 41 and propeller hubs 42 that can be used with the belt system 44 are shown. For example, the drive pulleys 41 and propeller hubs 42 could be grooved 81, a pulley 82, threaded 83 or keyed 84. It is important that the pulley hub 42 and drive pulley 41 create a friction force a with the belt system 44 such that the rotational force of the motor 11 is transmitted to the dynamo. A typical drive motor 84 is shown apart from the drone FIG. 9 shows an alternative embodiment where the propeller hub 141 and alternator 120 may be built into the housing that includes the propeller 112. The rotation of the propeller 112 in the embodiment of FIG. 9 would directly impart the rotational movement of the coils within the alternator 120 or dynamo. There would be no need for the system to include the system of belt drives and pulleys when the dynamo 120 is positioned within shaft 115 of the motor 111 for the propeller 112. The electric current generated by the alternator 120 or the dynamo could be directly fed to the battery pack.

It should be appreciated that FIGS. 1, 3 and 9 depict a leading edge of the propeller blade 113 that includes the z-shaped, stepped leading edge fan blade 122 sold under the trademark Z-TECH® leading edge technology. The z-shaped, stepped leading edge fan blade 122 positioned along a leading edge extends beyond the generally uniform width of a typical propeller blade. The stepped leading edge fan blade 122 leading edge technology is disclosed and described in U.S. Pat. Nos. 11,698,081, 11,168,703 and 10,428,831 which are incorporated by reference in their entirety herein in this application.

The steps may be of equal length whereby the first step closest to the hub is the same length as the other steps. Thus, a preferred ratio of the width of the steps of the leading edge in the present invention is 3:2:1; in essence, the leading edge is an additional 3 inches to the width of the propeller, the second step is an additional two inches from the width of the typical propeller blade and the third step is an additional 1 inch from the width of the typical blade.

One of the benefits of having a stepped leading edge 122 on the propeller blade is that movement of the blade creates greater airflow velocity than the existing propeller blade. Another advantage of the stepped design is that it provides for a vortex along the edge of the blade.

The leading edge of the propeller blade has a first step and a second step. The leading edge could also include a third step as well. The steps extend from the blade body of the propeller. The blade body is typically made of plastic or aluminum. The leading edge of the propeller blade, including the first step and the second step may be preferably made of an extended polymer material, such as high-impact polystyrene, but may be constructed of a composite plastic material, graphite, fiberglass, carbon fiber, aluminum or any material having similar features and properties to the identified materials.

The steps preferably have generally equal lengths proportional to the length of the blade body. Thus, the first step would be approximately ½ the total length of the blade body. The second step would also be approximately ½ the total length of the blade body. Likewise, if a third step were included each step would be approximately ⅓ the total length of the blade body. The steps may have a width in a ratio of 3:2:1.

While the preferred number of steps is 3 with a ratio of 3:2:1, the number of steps may be more than 3, so long as the ratio of length of the steps corresponds to the number of steps and the distances the various steps extend beyond the front edge of the blade body is a ratio equal to the number of steps.

The blade of the propeller may include a lead edge. The leading edge includes a series of steps. There is a distance between the first step and the second step of the leading edge. Likewise, the distance between the second step and the third step. The blade has an upper portion and a lower portion. The blade also has a reward portion. The steps along the leading edge of the blade generate a vortex along the edge of the steps. The vortex created at the edges of the steps generates turbulent air flow below the propeller blade. The vortex created at the edges of the steps also provide for greater air flow velocity in the area near the center line of the propeller.

Figure 10:
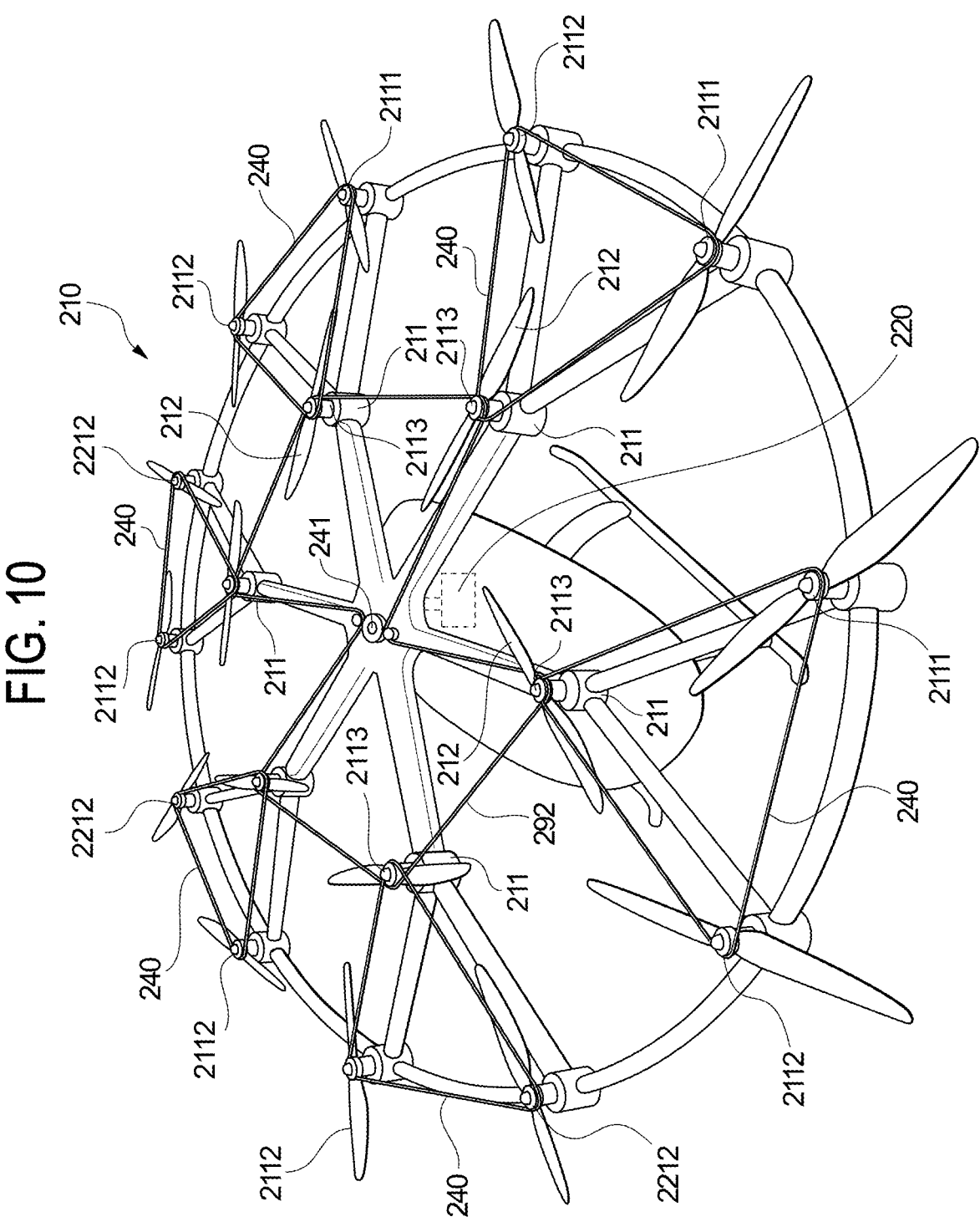
FIG. 10 shows a perspective view of an embodiment of the present invention depicting a serpentine belt system.

FIG. 10 depicts the system of the present invention using a serpentine style belt system used in an energy recovery system 200 with the present invention. The system includes a drive pulley 241 which is attached to a drive shaft configured to operate an energy recovery system 200 as depicted and discussed in FIG. 10 above. The serpentine style belt system 292 depicted in FIG. 10 provides for a reduced number of motors due to the implementation of the energy recovery system of the present invention. Therefore, instead of having a motor affixed to each propeller, the embodiment of FIG. 10 has one or more motors 211 that drives a motor propeller 212 and two (or more) auxiliary propellers 2112 and 2212. The auxiliary propellers 2112 and 2212 are affixed to propeller belt 240 through a series of hubs as described above in the application. The rotation of the motor drive 211 and motor hub 242 causes movement of the belt 240 placing a rotational force on the hubs of the auxiliary propellers 2112 and 2212. The rotation of the motor drive 211 powers the auxiliary propellers 2112 and 2212 which are not connected to a motor. The motor drive 211 provides power to the motor propeller 212 and auxiliary propellers 2112 and 2212. The embodiment minimizes the number of motors that are required in the system, thus, decreasing the weight of the drone 210. There may be the addition of tensioners 294 built into the system to provide proper tension on the belt 240.

The serpentine style belt system 292 operates to have a main drive pulley 241 that provides the rational force necessary to power the energy recovery system 220. The main drive pulley 241 is driven by a main belt 292. The main belt 292 is configured to link to a series of hubs associated with a motor. The belts may be configured from polyurethane, rubber, leather or other material as described above. Each of the motors 211 is linked to a propeller drive system which includes two propellers 2112 and 2212. The motors 211 operate to drive both the main belt 292 and the propeller belt 240. The benefit of the pulley system is that it provides a redundancy built into the system. For example, if one of the motors fails for some reason, the other motors continue to operate to maintain the drone in the air. The system includes a series of motors 211 that each power three propellers 2111, 2112 and 2113. The motor also drives a main belt 292 that drives the drive 241. Motor 211 operates to supply power not only to the propeller affixed to the motor, but also supplies power to the two auxiliary propellers 2112 and 2113. The auxiliary propellers 2112 and 2113 do not have independent motors. Instead, the propellers 2112 and 2113 are driven by belt 240 affixed to the pulley of the motor 211. There are a series of motor systems comprising a motor 211, a motor propeller 2111 fixed to motor 211 and two auxiliary propellers 2112 and 2113 powered by the motor 211. The motor systems provide for reduced weight because motor 211 of the motor system provides power to three propeller systems, thus reducing the number of motors required to run the drone. The system also provides the necessary drive to supply the excess energy to drive 241 to operate the energy recovery system 220. The reason there are a series of motor systems in the drone is that should one motor system fail, there are other motor systems that would continue to operate to maintain the drone airborne. In FIG. 10, there are six motor systems depicted. The invention is not limited to the number of motor systems. There could be two or more motor systems utilized in the invention without departing from the spirit of the invention. The important aspect of the embodiment shown in FIG. 10 is that there is a reduced number of motors 211 which supply power to the motor systems The embodiment shows the propeller belts 240 and the main belt 292 as being exposed, however, the drone 210 may be configured in such a manner that the propeller belts 240 and main belt 292 are contained in the housing or separate structure.

Figure 11:
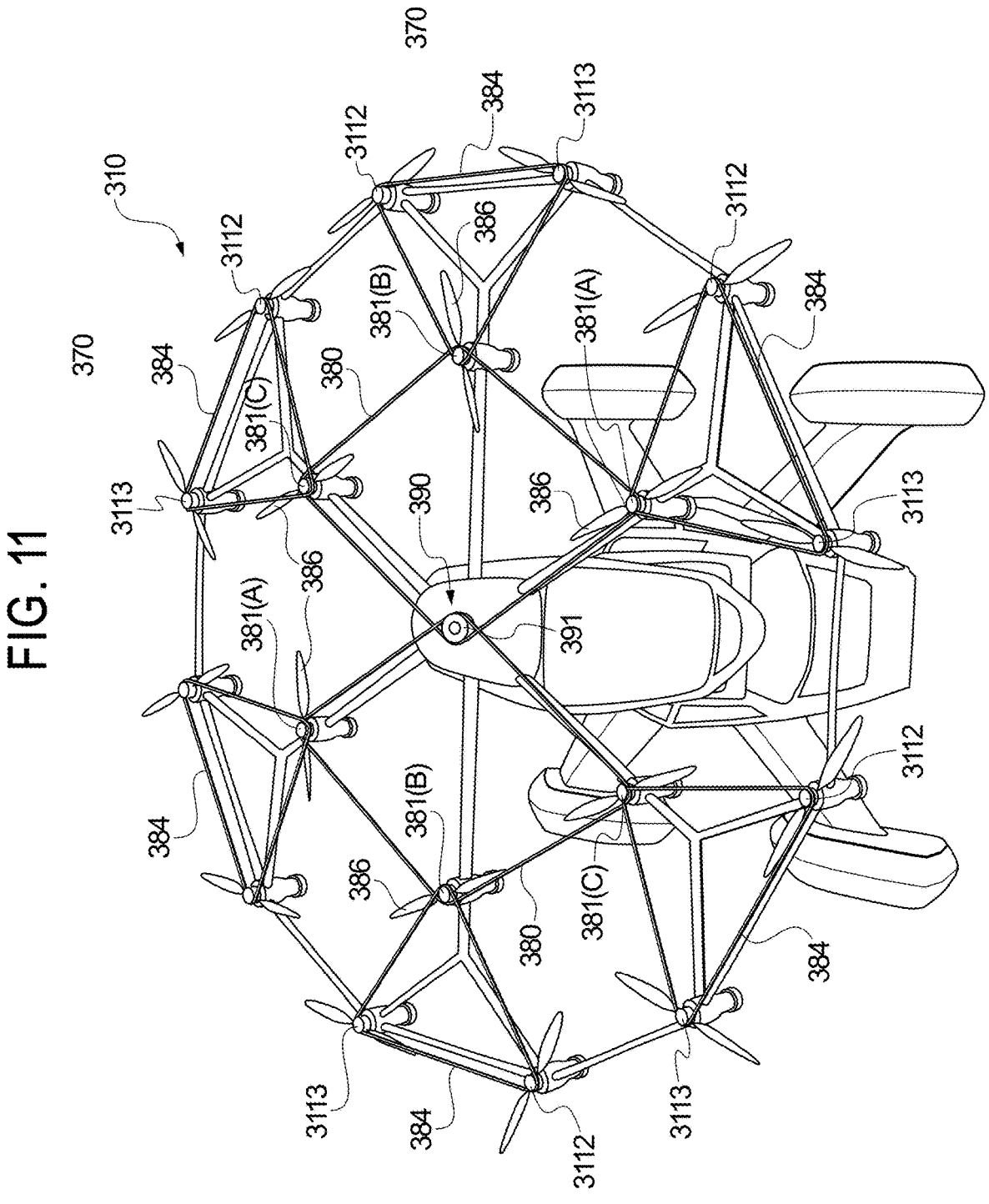
FIG. 11 shows a perspective view of an embodiment of the present invention depicting a serpentine belt system.

FIG. 11 depicts another embodiment of the present invention that includes a drone 310 having a direct drive motor 390 built into the drone that also includes a redundancy system built into drone 310. The system depicts a direct drive motor 390 that includes a dual pulley 391 the direct drive motor 390 provides a rotational force on the shaft the rotates the dual pulley 391. The dual pulley 391 is affixed to at least one pulley system 380 that comprises a series of propeller systems 381. Each pulley system 380 includes a pulley belt 384 that cooperates with three propeller system 381(*a*), 381(*b*) and 381(*c*) of the pulley system 380. The rotational force of the direct drive motor 390 creates a rotational force on the dual pulley 391 which drives the pulley belt 380. As the pulley belt 380 rotates, it generates a rotational force along the three propeller systems 381(*a*), 381(*b*) and 381(*c*). The propeller systems 381(*a*), 381(*b*) and 381(*c*) each include a propeller pulley and a propeller 386. The rotational force generated by the rotation of the pulley belt 380 generates a rotational force causing each propeller 386 of the propeller systems 381(*a*), 381(*b*) and 381(*c*) to rotate. The rotation of the propeller 386 creates the lift forces and guidance forces of the directional forces to guide the drone 310.

The embodiment of FIG. 11 also includes a series of auxiliary propeller systems 370 that correlate to one of the propeller systems 381(*a*), 381(*b*) and 381(*c*). The propeller systems 381(*a*), 381(*b*) and 381(*c*) operate to drive each auxiliary propeller system which includes two auxiliary propellers 3112 and 3113. Each propeller system 381(*a*), 381(*b*) and 381(*c*) operates to supply power not only to the propeller affixed to the propeller system, but also supplies power to the two auxiliary propellers 3112 and 3113. The auxiliary propellers 3112 and 3113 do not have independent motors. Instead, the propellers 3112 and 3113 are driven by auxiliary belt 344 affixed to the pulley of the propeller systems 381(*a*), 381(*b*) and 381(*c*). There may be a series of auxiliary propellers 3112 and 3113 that coordinate with each of the propeller systems 381(*a*), 381(*b*) and 381(*c*). The motor systems provide for reduced weight because the direct drive motor supplies power to the pulley system 380 which in turn supplies the rotational force to the propeller systems 381(*a*), 381(*b*) and 381(*c*) which provides power to auxiliary propeller systems 3112 and 3113, thus reducing the number of motors required to run the drone to a single direct drive motor 390. In FIG. 11, there are six propeller systems 381 depicted and six auxiliary propeller systems 3112 and 3113 depicted. The invention is not limited to the number of propeller systems depicted in FIG. 11 nor is the invention limited to the six auxiliary propeller systems 3112 and 3113 depicted in FIG. 11. There could be two or more (or less) propeller systems and auxiliary systems utilized in the invention without departing from the spirit of the invention. The important aspect of the embodiment shown in FIG. 11 is that there is a direct drive motor 390 which supplies power to the propeller systems and auxiliary systems of the invention. The benefit of the propeller systems and auxiliary systems of the invention is that a failure in one of the propeller systems or an auxiliary system does not necessarily prevent the drone 310 from maintaining its ability to stay airborne. The direct drive motor 390 of the invention is shown as a battery powered servo motor, it should be understood that a gas powered, or hydrogen powered motor could be used as a direct drive motor system. Also, it should be understood that while the preferred embodiment shows only one direct drive motor, there may be one or more direct drive motors utilized in the invention without departing from the spirit of the invention. For example, the propeller systems 381(*a*), 381(*b*) and 381(*c*) could each include a direct drive motor without departing from the spirit of the invention.

While not part of the embodiment depicted in FIG. 11, the pulley system 380 may include an energy recovery system 20 as part of the design as depicted in FIGS. 1 through 4. The system also provides the necessary drive to supply the excess energy to drive to operate the energy recovery system. The energy recovery system 20 could be affixed to each of the propeller systems 381(*a*), 381(*b*) and 381(*c*). The energy recovery system could also provide stored energy to a battery backup system. The battery backup system could provide energy to propeller systems 381(*a*), 381(*b*) and 381(*c*) or in the event of a failure to the direct drive system the battery backup could provide energy to the propeller systems 381(*a*), 381(*b*) and 381(*c*). The reason there are a series of motor systems in the drone is that should one motor system fail, there are other motor systems that would continue to operate to maintain the drone airborne.

Figure 12:
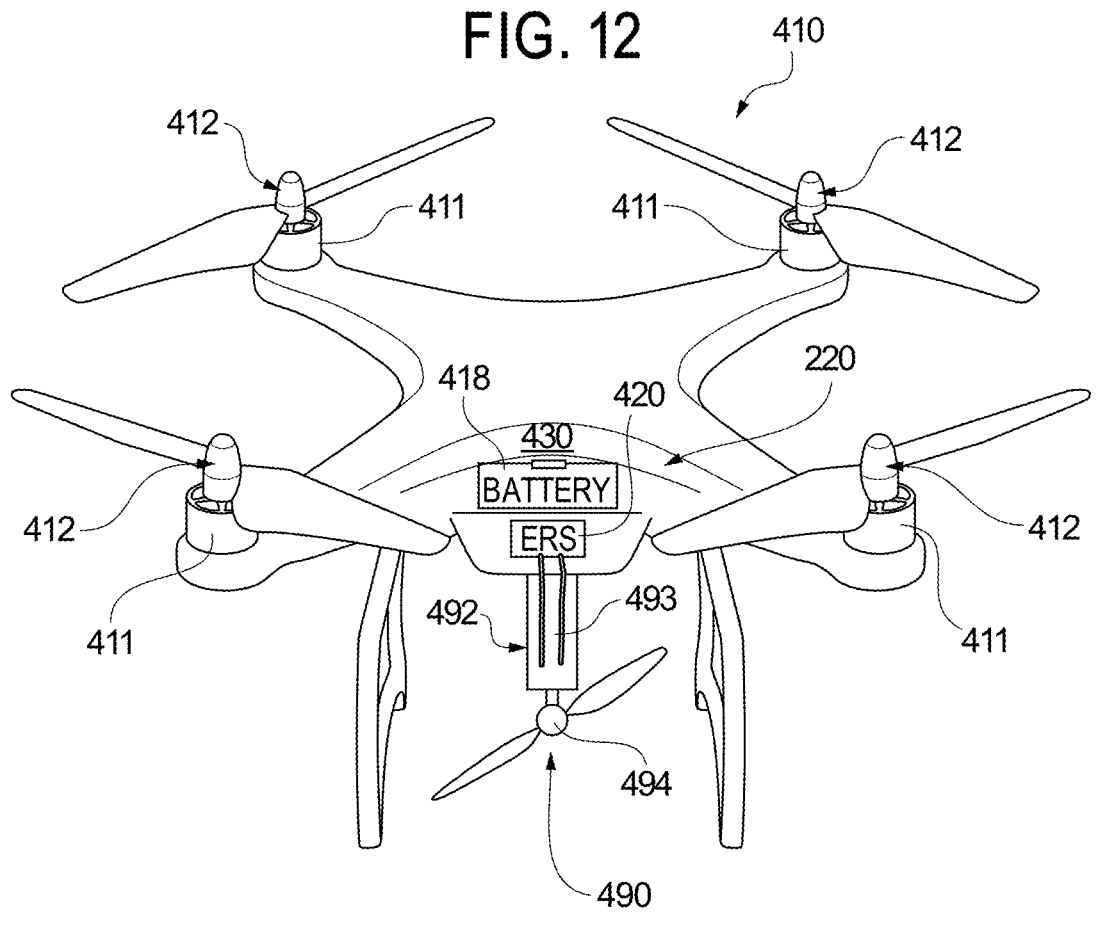
FIG. 12 shows a perspective view of an embodiment of the present invention depicting a auxiliary energy recovery system mounted to the housing.

FIG. 12 depicts an alternative embodiment of the present invention the utilizes an auxiliary energy recovery system. In FIG. 12, the drone 410 includes a housing 430, series of propellers 412 extending from the housing 430 that are driven by a motor 411. The system could be used with either a battery powered or gas-powered motor 411 to provide power to the propellers 412. The auxiliary energy system 490 comprises an auxiliary propeller system 494 that extends from the housing 430. The auxiliary propeller system 494 comprises a support 492 and drive mechanism 493 enclosed in support 492. The drive mechanism 493 is depicted as being enclosed in the support 492, however, the support may consist of a frame that does not completely enclose the drive mechanism 493 in the support 492. The support 492 is affixed to the housing 430. The energy recovery system 420 includes an auxiliary propeller 494 that operates to provide rotational force to the drive mechanism 493. Within the housing is an energy recovery system 420. The drive mechanism 493 provides a rotational force to the energy recovery system 420. As explained in detail above energy recovery system 420 may include an alternator, dynamo or other type of energy capturing system. The energy recovery system 420 is positioned within housing 430 of the drone 410. It should be understood by those of skill in the art that the energy recovery system 420 may include an alternator, an embedded inverter, a dynamo or a direct current generator. The important feature of the energy recovery system 420 is that the system operates to recover energy that is produced by the rotation of the auxiliary propeller 494.

The auxiliary propeller 494 may be a turbine, fan or propeller connected to the energy recovery system 420 to utilize the rotational force generated by the drone's 410 movement through the air to generate power for the drone. The auxiliary propeller may incorporate the stepped leading edge fan blade technology explained above such that when the drone 410 is traveling under power through the air the optional free-spinning auxiliary propeller 494 is naturally rotating and creating free transferable energy. The auxiliary energy recovery system operates to recover energy based on the use of the airflow generated from the movement of the drone 420 through the air. The free spinning auxiliary propeller 494 (can be variable pitch) mounted the support 492 as shown in the drawings is capturing air while in flight. The auxiliary energy recovery system has an embedded generator/dynamo that captures and then diverts energy charging the existing battery system. Whether the existing drone is powered via. battery, direct drive (electric), or geared (gas/fueled) the recapturing propeller while in flight captures and diverts energy, and this energy transfers to the onboard battery system to allow for constant charge.

The energy recovery system 420 is configured in a manner to supply power to a battery pack 418. The energy recovery system 420 may also be configured to directly supply energy to the motors 411 of the drone if the drone is powered by an electric motor. In one embodiment the energy recovery system 420 would comprise of a dynamo, alternator or other electrical generating device that would supply electrical power to the motors.

The auxiliary energy recovery system operates by the movement of the drone 410 through the air as driver by propellers 412 causes the auxiliary propeller 494 to rotate. The rotation of the auxiliary propeller 494 operates to generate a rotational force upon the drive mechanism 493 that is transmitted to the energy recovery system 420. The energy recovery system transfers the energy to the battery pack 418 which stores the energy for latter use. The auxiliary energy recovery system may be used in conjunction with an electric motor, gas powered motor or any other type of motor. The auxiliary energy recovery system may be used as a means to supplement the primary energy source of motor 411 or it could be used as a backup power source should the primary energy source fail The auxiliary energy recovery system adds to the overall safety of the drone 420. The auxiliary energy recovery system allows for drone 420 to make longer flights and prolongs the battery life eliminating the need for expensive maintenance costs. This feature is very sustainable, eliminating the dangers of batteries and radiation concerns.

The auxiliary energy recovery system further allows the drone 420, when fueled, to enter its destination, then the ability to cut power to the fuel source, and the battery(s) takes over and the drone becomes silent. These features operate like the newer vehicles manufactured with auto stop-start and wind turbines installed globally.

There is a further embodiment of the present invention that incorporates a type of wind turbine called a vorticular ventilator which operates to generate a rotational force caused by the movement of the drone through. The air passing over the scoops of the turbine cause the turbine blades to rotate. The vorticular ventilator operates on the principle that the energy in the air flow created by movement of the drone through the air turns two or three propeller-like blades (termed "scoops") around a rotor or drive shaft. The rotor is connected to the main shaft, which spins a generator to create electricity as explained in more detail above. The vorticular ventilator of the present invention further operates to create a flow of air into the internal mechanism of the drone to provide a cooling effect on the components. The rotary design needs zero power, and minimal air movement to operate. It is extremely lightweight, maintenance-free, and creates a convective air-cooling transfer, unlike a propeller mounted vertically, which will have little resistance to the operation of the drone. Examples of the benefits of using a vorticular ventilator on a drone are set forth as follows:

1. A rotary ventilator design collects the wind's kinetic energy with no running costs.
2. Wind flowing through the rotary design causes constant airflow.
3. The rotary design is connected to a drive shaft that turns an electric generator/inverter/dynamo.
4. The generator/inverter/dynamo produces electricity.
5. This electricity is used to charge the battery system
6. The airflow (stack effect) pulls excessive heat and condensation from the housing body which aids in cooling the internal components. Air pulled from the cube/cabin assists with exhausting fumes and (PM2) pathogens making for a healthier system. When humans taxi via drone passengers the present invention provides for a ventilated flight constantly and exhausting contaminated cabin air.
7. Increased safety no blades or airfoils—extremely quiet.

The vorticular ventilator includes blades or scoops. When an airstream is moved across the scoops, the air stream provides a lifting force and rotates the scoops when wind is blown over the scoops, causing the rotor to spin. The scoops are affixed to a hub which may be separate pieces of integral to each other. The rotor may be affixed to a gear box which connects the rotor to a high-speed shaft and increases the rotational speeds from about 30-60 rotations per minute (rpm), to about 1,000-1,800 rpm. The shaft drives the generator, dynamo or alternator which produces electrical energy through induction. The vorticular ventilator consist of two or three scoops incorporated in a rotor to take advantage of the wind speeds created by movement of the drone through the air.

The vorticular ventilator may incorporate propeller-like blades to harness the wind's energy, wherein the blades act much like an airplane wing. When the wind blows, a pocket of low-pressure air forms on one side of the blade. The low-pressure air pocket then pulls the blade toward it, causing the rotor to turn. This is called a lift force. The force of the lift is much stronger than the wind's force against the front side of the blade, which is called drag. The combination of lift and drag causes the rotor to spin like a propeller. It should be appreciated by a person of ordinary skill in the art that the use of a scoop or propeller in the present invention is interchangeable. As such, one should appreciate that the use of the term scoop or propeller does not limit the invention to either of those embodiments. The terms are used interchangeably in this disclosure.

Although the illustrative embodiments of the disclosure of the present invention have been described herein with reference to the accompanying drawings and disclosures, the above description, disclosures and drawings. It is to be understood that the disclosure is not limited to the precise embodiments, and that various other changes and modifications should not be considered as limiting, but merely an exemplification of the particular may be made by a person of ordinary skill in the art without departing from the scope or spirit of the disclosure of the inventions contained herein. The vorticular ventilator may take the form of a Savonius wind turbine or a type of vertical-axis wind turbine used for converting the force of the wind into torque on a rotating shaft. The vorticular ventilator could also take the form of a Darrieus or eggbeater design wind turbine. It is important to note that the design of the turbine is not imperative so long as turbine consists of a number of airfoils, usually—but not always—vertically mounted on a rotating shaft or framework. Alternatively, the turbine could consist of a series of propeller blades mounted on a rotating shaft or drive.

Figure 13:
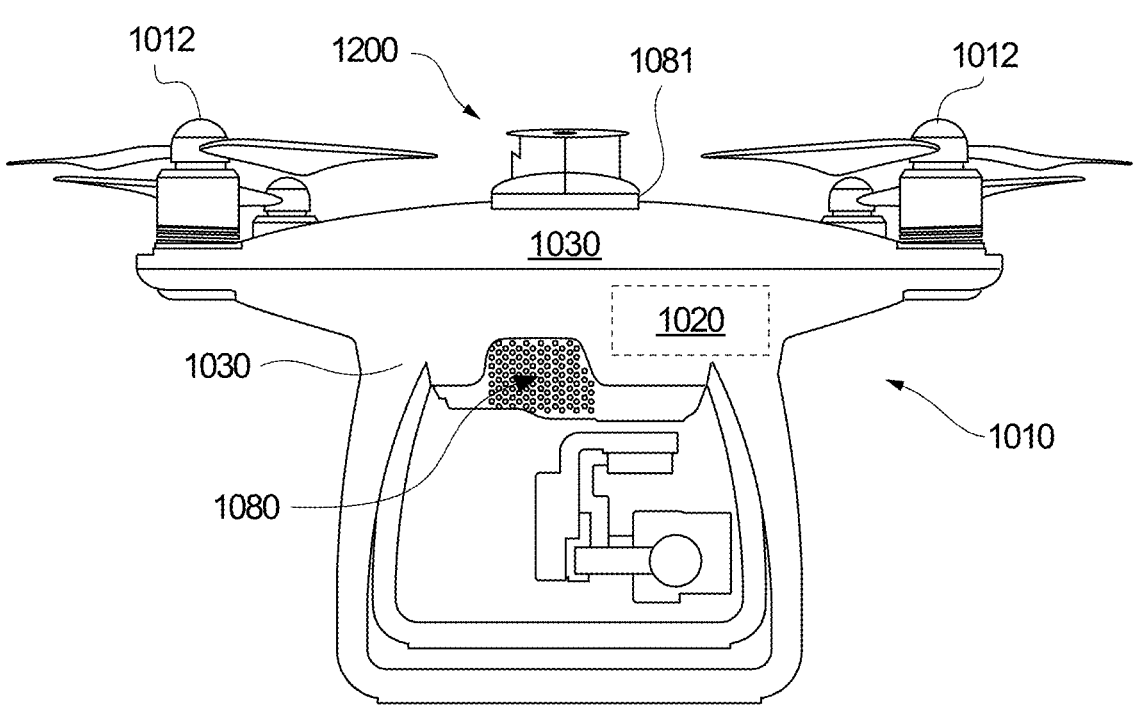
FIG. 13 is a is a side view of an embodiment of the present invention depicting the vorticular ventilator at the upper portion of the drone.
Figure 14:
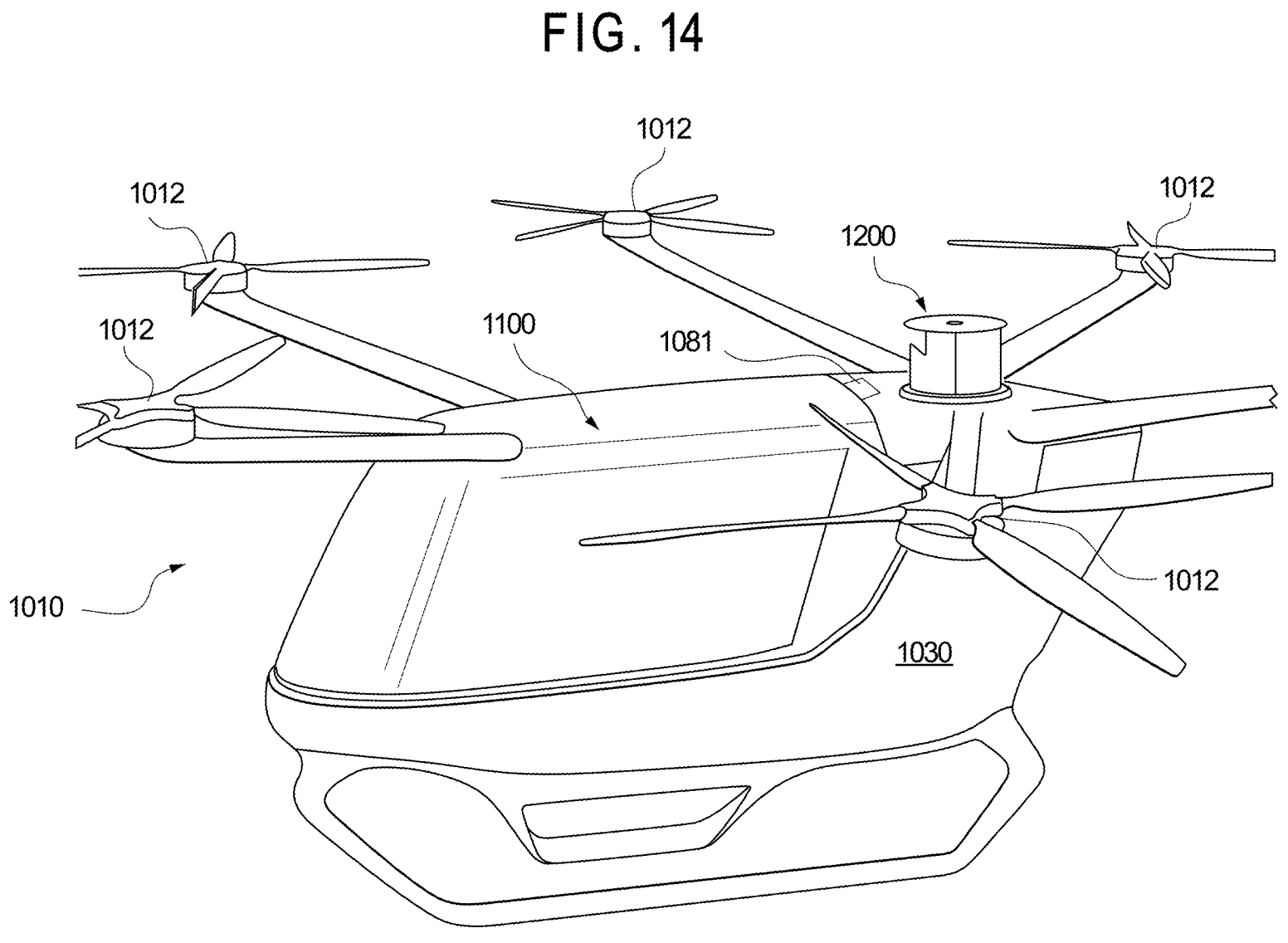
Figure 18:
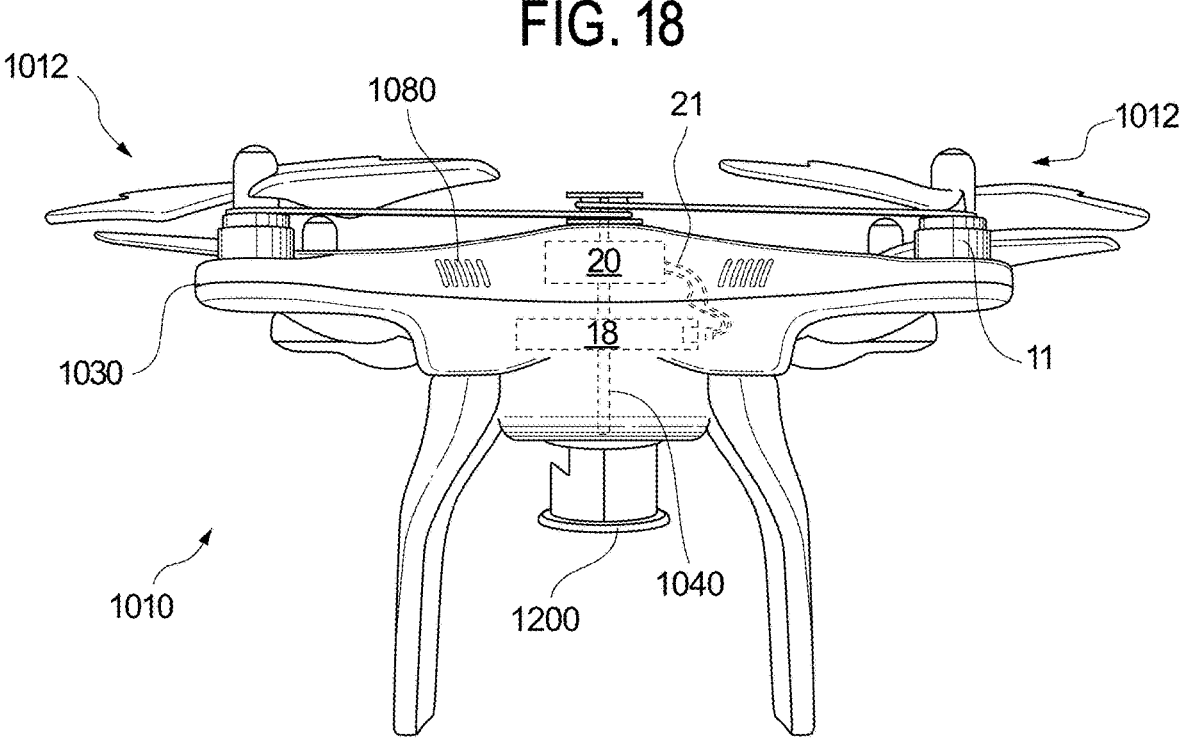
FIG. 18 is a is a perspective view of an embodiment of the present invention depicting the vorticular ventilator at the lower portion of passenger drone.

Turning to FIGS. 13, 14 and 18, the drone 1010 has a housing 1030. The drone 1010 includes propellers 1012 with each propeller 1012 including a propeller motor 1011. The housing 1030 of the drone 1010 may include a vent 1080 that is positioned on both the top portion of the housing 1030 and the lower portion of the housing to allow for the flow of air through the internal body of the housing 1030. In FIG. 14 the vent 1081 is positioned in proximity to the cabin 1100. The vents 1080 or 1081 may be positioned in proximity to a vorticular ventilator 1200. The purpose of positioning the vents 1080 or 1081 in proximity to the vorticular ventilator 1200 is to allow the flow of air from the vorticular ventilator 1200 to the cabin 1100 or the internal portion of the housing 1030.

A vorticular ventilator 1200 is an apparatus that generates a whirling, rotary motion in air generating a spiraling movement similar to a whirlpool. The vorticular ventilator 1200 may be positioned on the top portion of the housing 1030 as depicted in FIGS. 13 and 14 or it may be positioned on the lower portion of the housing 1030 as depicted in FIG. 18. The vorticular ventilator 1200 may include several shapes such as a wind Savonius turbine (having two or more scoops), a propeller turbine or a Darrieus type of structure (eggbeater). The vorticular ventilator 1200 is a small turbine driven by air flow. The air flow causes the air turbines to produce mechanical energy. In the current invention the mechanical energy is converted into electricity through the operation of a generator or energy recovery system 1020.

The propeller turbine is typically mounted on the housing 1030 such that the rotors are portioned toward the front of the drone 1010 in the typical direction of the movement of the drone 1010.

Figure 15:
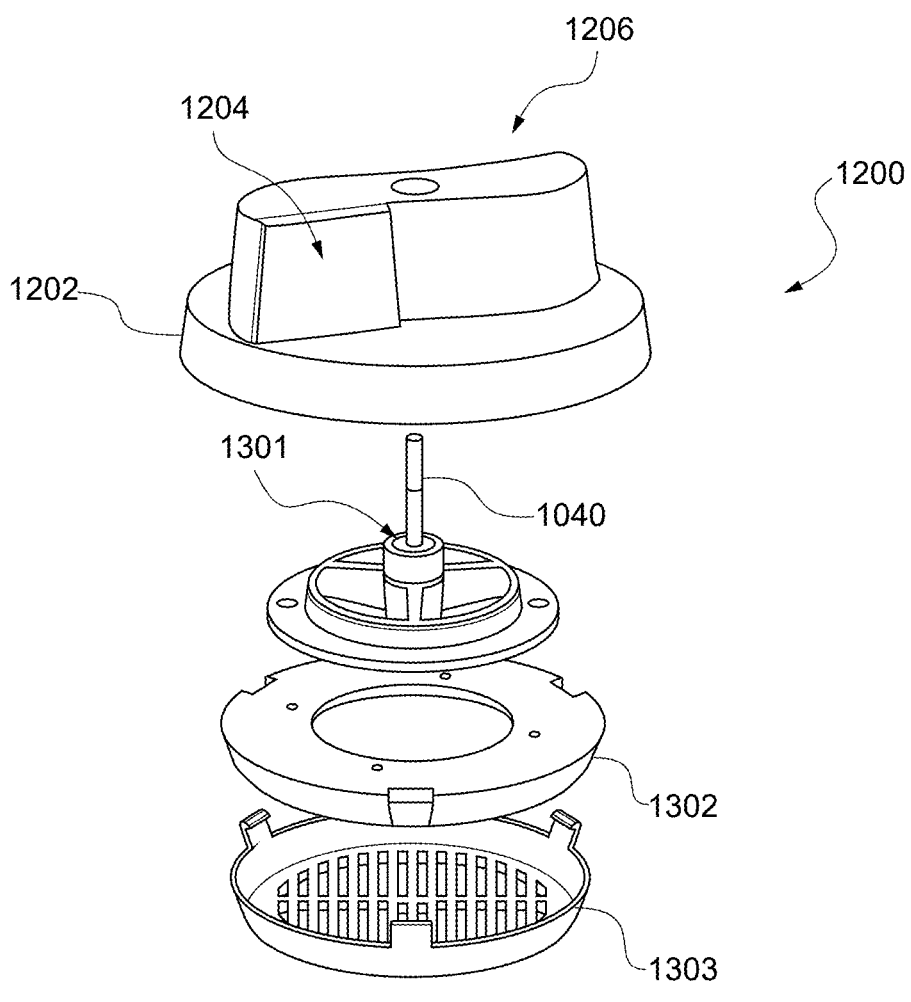
FIG. 15 is an exploded view of an embodiment of the present invention depicting the vorticular ventilator.

The vorticular ventilator 1200 of the present invention is preferably a scoop-type design having two or more contact surfaces 1204, 1206 as shown in FIGS. 16-18. As shown in FIGS. 15 and 16 the vorticular ventilator 1200 includes a base 1202 that is circular in shape. It also may include a connector 1302 to connect the vorticular ventilator 1200 to the drone 1010. The vorticular ventilator 1200 could also be integrated into the housing 1030 of the drone 1010. The vorticular ventilator 1200 further includes a series of contact surfaces 1204 and 1206. The contact surfaces 1204 and 1206 are designed to form a scoop to collect air as it passes over the surface of the contact surfaces 1204 and 1206. The preferred embodiment of the present invention shows two contact surfaces 1204 and 1206, it should be appreciated that there can be three or more contact surfaces without departing from the scope of the invention. It should also be appreciated that, while the preferred embodiment of the present invention uses a twin surface rotor, the vorticular ventilator 1200 may be of a two or more scoops turbine, propeller or eggbeater types of design. The important feature is that the vorticular ventilator 1200 includes at least two contact surfaces 1204 and 1206 to collect the flow of air and generate a rotational force around a center axis. The vorticular ventilator 1200 operates to rotate as an air flow is directed along the contact surfaces 1204 and 1206 of the vorticular ventilator 1200. The contact surfaces 1204 and 1206 are scooped design to collect the air and rotate the contact surfaces 1204 and 1206 around a center axis 1210.

The scooped portion of the contact surfaces 1204 and 1206 may alternatively be configured using the z-shaped, stepped leading edge fan blade design as shown in FIG. 16B. It should be appreciated that utilizing a leading edge of the contact surfaces 1204 and 1206 that includes the z-shaped, stepped leading edge fan blade 1122 leading edge technology which is sold under the trademark Z-TECH®. The Z-tech stepped leading edge fan blade style surface 1122 positioned along a leading edge contact surfaces 1204 and 1206 extends beyond the generally uniform width of a typical scoop contact surface. The z-shaped, stepped leading edge fan blade 1122 leading edge technology is disclosed and described in U.S. Pat. Nos. 11,698,081, 11,168,703 and 10,428,831 which are incorporated by reference in their entirety herein in this application with respect to the leading edge of the contact surfaces 1204 and 1206. The z-shaped, stepped leading edge fan blade design in the drawings shows 3 steps. The z-shaped, stepped leading edge fan blade 1122 leading edge includes a series of steps 1140, 1142 and 1144. The distance between the first step 1140 and the second step 1142 of the leading edge 1122 is shown as being equal. Likewise, the distance between the second step 1142 and the third step 1144 is shown as being equal. Steps 1140, 1142 and 1144 along the leading edge of the z-shaped, stepped leading edge fan blade leading edge 1122 provides vortex along the edge of the steps 1140, 1142 and 1144. The vortex created at the edges of steps 1140, 1142 and 1144 create a greater turbulent airflow around the rotor which in turn generates more rotational force. The vortex created at the edges of the steps 1140, 1142 and 1144 also provide for greater airflow velocity in the area near the centerline 1210 of the vorticular ventilator 1200.

FIG. 17 shows an exploded view of the vorticular ventilator 1200. The figure depicts the contact surfaces 12040 and 1206. Also shown is the gear drive shaft 1040. The drive shaft 1040 operates in the same manner as the drive shaft 40 shown in FIGS. 1, 2 and 3. The drive shaft is connected to a drive shaft 40, wherein the rotation of the drive shaft 40 operates to affect the energy charging system 20.

The drive shaft 1040 of the vorticular ventilator 1200 operates to rotate along with the rotation of the contact surfaces 1204 and 1206 around the central axis 1210. The energy recovery system 20 includes the drive shaft 1040. The drive shaft 1040 rotates due to the force imparted upon the contact surfaces 1204 and 1206 to impart power or energy into the energy recovery system 20. The drive shaft 1040 can be configured to coordinate with either an alternator, dynamo or generator as part of the energy recovery system 20 such that the rotation of the contact surfaces 1204 and 1206, causes the movement of the drive shaft 1040 which rotates the alternator, dynamo or generator of the energy recovery system 20 which causes the alternator to accumulate an electrical charge. The rotation of the contact surfaces 1204 and 1206 generates a rotation force on the drive shaft 1040 providing the rotation force to the alternator of the energy recovery system 20. The alternator of the energy recovery system 20 is connected to the drone battery pack 18 which comprises rechargeable batteries. The alternator of the energy recovery system 20 operates to provide power to the battery pack 18 as the drone's propellers 12 are operated. Thus, during flight, the rotational movement of the contact surfaces 1204 and 1206, cause the drive shaft 1040 to rotate. The rotational force causes the alternator to rotate coils of wire and magnetic fields to convert mechanical rotation into a pulsing direct electric current. The current is directed to battery pack 18 through a wire harness 21 connected to the battery pack 18.

While the present invention contemplates the use of a direct drive shaft 1040 with the energy recovery system 20, it should be understood that there could be a gear drive system to impart a greater rotational force on the energy recovery system 20. In other words, there may be a gear drive which directly imparts the rotational force on the generator 20. A system of gears and rods could be used to provide a rotational force on the generator 20 whereby the generator 20 creates electrical energy that can be used to charge a battery pack 18 or provide electrical energy directly to the motor 11. The gears and rods may be configured to impart an increased rotational force upon the energy recovery system 20.

The vorticular ventilator 1200 may also include a fan 1301, a connector 1302 and a vent 1303. The fan 1301 is affixed to the drive shaft 1040. Even the drive shaft 1040 rotates, the rotation causes the fan 1301 to rotate as well. As the fan 1301 rotates it causes air to be propelled through vent 1303 into a space adjacent the vent 1303. The vorticular ventilator 1200 may be affixed to the drone 1010. The benefit of the vent 1303 and fan 1301 is that the airflow (stack effect) pulls excessive heat and condensation from the housing body which aids in cooling the internal components. Air pulled from the housing 1030 or cabin assists with exhaust fumes and (PM2) pathogens making for a healthier system. The fan 1301 operates to create an airflow through the internal components of the drone 1010 such as energy recovery system 20, the battery 18, the motors 11 as well as any other internal components. The placement of a vent 1080 in the housing 1030 of the drone 1010 operates to allow the vorticular ventilator 1200 to move air across the internal components of the drone 1010 such as energy recovery system 20, the battery 18, the motors 11 to provide a cooling effect on the components. It has been shown that the cooler temperature in which the internal components are maintained, the longer life span can be obtained by the components. Having the vorticular ventilator 1200 positioned near the vent 1080 in the housing 1030 will create a healthy atmosphere in the pilot/passenger areas exhausting harmful pathogens as shown in FIG. 14 while having a vent 1080 in the housing may effectuate cooling critical components of the drone to extend the life of the components as shown in FIG. 13.

It should be understood that the vorticular ventilator 1200 can be adapted work in place of the rotational drive pulley 41. In this configuration the operation of the belts and pulley function to rotate the fan 1301 in the vorticular ventilator 1200 such that the fan provides a cooling effect on the internal components of the drone 1010.

While specific combinations of elements are disclosed in specific embodiments, it should be understood that any combination of the different features may be utilized in the combined fan. It is understood that elements from each of the embodiments may be utilized in any or all of the other embodiments without departing from the spirit of the invention.

The foregoing disclosure and description of the invention are illustrating and explanatory thereof, and various changes in the size, shape and materials as well as in the details of illustrated construction may be changed without departing from the spirit of the invention.

It is understood that the invention is not limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for capturing energy from a vorticular ventilator to utilize the energy to charge a power source, the apparatus comprising:

a housing;

a plurality of propeller systems connected to the housing, wherein each of the propeller systems is configured to have a motor, a propeller shaft and a propeller affixed to the propeller shaft;

a power source positioned in the housing configured to power each of the motors of the propeller systems;

an energy recovery system mounted in the housing, wherein the energy recovery system includes a wire harness connecting the energy recovery system to the power source, wherein the energy recovery system converts a rotational force into mechanical energy that then drives a generator which converts the mechanical energy into electrical energy;

a vorticular ventilator including a plurality of air scoops rotatable around an axis, wherein the air scoops are adapted to deflect an air flow to cause the air scoops to rotate around the axis and the vorticular ventilator further including a base affixed to the housing;

a drive shaft affixed to the vorticular ventilator at the axis, wherein the rotation of the air scoops around the axis, causes rotation of the drive shaft, the drive shaft is configured to impart the rotational force to the energy recovery system, whereby the rotation of the drive shaft imparts mechanical force on the energy recovery system which converts the mechanical force to electrical energy which is stored in the power source; and wherein the wire harness of the energy recovery system transfers the electrical current generated by the energy recovery system to the power source in such a manner that the electrical current is utilized to provide power to the power source.

2. The apparatus for capturing energy from a vorticular ventilator to utilize the energy to charge a power source of claim 1, wherein the air scoops of the vorticular ventilator are configured in a Savonius structure.

3. The apparatus for capturing energy from a vorticular ventilator to utilize the energy to charge a power source of claim 1, wherein the air scoops of the vorticular ventilator are configured in a Darrieus structure.

4. The apparatus for capturing energy from a vorticular ventilator to utilize the energy to charge a power source of claim 1, wherein the air scoops of the vorticular ventilator are configured in a propeller structure.

5. The apparatus for capturing energy from a vorticular ventilator to utilize the energy to charge a power source of claim 1, wherein, each of the air scoops of the vorticular ventilator comprise:

a leading edge, wherein the leading edge forming a plurality of steps including at least a first step, a second step, and a last step along a length of the leading edge, wherein the first step, the second step, and the last step decreases in a width edge of the air scoop between the leading edge and a trailing portion;

the plurality of steps further including a first air contact surface, a second air contact surface, and a last air contact surface, wherein the first air contact surface corresponds to the first step, the second air contact surface corresponds to the second step, and the last air contact surface corresponds to the last step;

and the plurality of steps are each configured to create a vortex.

6. The apparatus for capturing energy from a vorticular ventilator to utilize the energy to charge a power source of claim 5, wherein the leading edge has a length, and the length of each of the first step, the second step and the last step of the plurality of steps are proportional along the leading edge.

7. The apparatus for capturing energy from a vorticular ventilator to utilize the energy to charge a power source of claim 1, wherein the housing has a top portion and a bottom portion and the vorticular ventilator is positioned at the top portion of the housing.

8. The apparatus for capturing energy from a vorticular ventilator to utilize the energy to charge a power source of claim 1, wherein the housing has a top portion and a bottom portion and the vorticular ventilator is positioned at the bottom portion of the housing.

9. The apparatus for capturing energy from a vorticular ventilator to utilize the energy to charge a power source, the apparatus comprising:

a housing having a top portion, an internal portion, a bottom portion and a housing vent and a vorticular ventilator vent;

a plurality of propeller systems connected to the housing along the top portion, wherein each of the propeller systems is configured to have a motor, a propeller shaft and a propeller affixed to the propeller shaft;

a power source positioned in the internal portion of the housing and configured to power each of the motors of the propeller systems;

an energy recovery system mounted in the housing, wherein the energy recovery system includes a wire harness connecting the energy recovery system to the power source wherein the energy recovery system converts mechanical energy that then drives a generator which converts the mechanical energy into electrical energy;

a vorticular ventilator including a plurality of air scoops rotatable around an axis wherein the air scoops are adapted to deflect an air flow to cause the air scoop to rotate around the axis and a base affixed to the housing, the vorticular ventilator positioned at the vorticular ventilator vent in the housing;

a drive shaft affixed to the vorticular ventilator at the axis wherein the rotation of the air scoops around the axis causes rotation of the drive shaft, the drive shaft is configured to impart the rotational force to the energy recovery system, whereby the rotation of the drive shafts imparts mechanical force on the energy recovery system which converts the mechanical energy to electrical energy which is stored in the power source;

a fan mechanism affixed to the drive shaft wherein the rotation of the drive shaft operates to rotate a fan in the fan mechanism, whereby the rotation of the fan causes an airflow and the air flow is directed through the housing vent and into the internal portion of the housing to effectuate cooling of the energy recovery system and the power source; and wherein the wire harness of the energy recovery system transfers the electrical current generated by the energy recovery system to the power source in such a manner that the electrical current is utilized to provide power to the power source.

10. The apparatus for capturing energy from a vorticular ventilator to utilize the energy to charge a power source of claim 9, wherein the air scoops of the vorticular ventilator are configured in a Savonius structure.

11. The apparatus for capturing energy from a vorticular ventilator to utilize the energy to charge a power source of claim 9, wherein the air scoops of the vorticular ventilator are configured in a Darrieus structure.

12. The apparatus for capturing energy from a vorticular ventilator to utilize the energy to charge a power source of claim 9, wherein, each of the air scoops of the vorticular ventilator comprise:

a leading edge wherein the leading edge, forming a plurality of steps including at least a first step, a second step, and a last step along a length of the leading edge, wherein the first step, the second step, and the last step decreases in a width edge of the air scoop between the leading edge and a trailing portion;

the plurality of steps further including a first air contact surface, a second air contact surface, and a last air contact surface, wherein the first air contact surface corresponds to the first step, the second air contact surface corresponds to the second step, and the last air contact surface corresponds to the last step; and the plurality of steps are each configured to create a vortex.

13. The apparatus for capturing energy from a vorticular ventilator to utilize the energy to charge a power source of claim 12, the leading edge has a length, and the length of each of the first step, the second step and the last step of the plurality of steps are proportional along the leading edge.

14. The apparatus for capturing energy from a vorticular ventilator to utilize the energy to charge a power source of claim 13, wherein the energy recovery system comprises a dynamo.

15. The apparatus for capturing energy from a vorticular ventilator to utilize the energy to charge a power source in claim 13, wherein the energy recovery system comprises an alternator.

* * * * *